(12) United States Patent
Soh et al.

(10) Patent No.: US 11,884,773 B2
(45) Date of Patent: *Jan. 30, 2024

(54) PHENOLIC RESIN, EPOXY RESIN, EPOXY RESIN COMPOSITION AND CURED PRODUCT OF SAME

(71) Applicants: NIPPON STEEL CHEMICAL & MATERIAL CO., LTD., Tokyo (JP); KUKDO CHEMICAL CO., LTD., Seoul (KR)

(72) Inventors: Masahiro Soh, Tokyo (JP); Kazuo Ishihara, Tokyo (JP); Jin Soo Lee, Seoul (KR); Jae Il Kim, Seoul (KR); Joong Hwi Jee, Seoul (KR); Ki Hwan Yu, Seoul (KR)

(73) Assignees: NIPPON STEEL CHEMICAL & MATERIAL CO., LTD., Tokyo (JP); KUKDO CHEMICAL CO., LTD., Seoul (KR)

( * ) Notice: Subject to any disclaimer, the term of this patent is extended or adjusted under 35 U.S.C. 154(b) by 139 days.

This patent is subject to a terminal disclaimer.

(21) Appl. No.: 17/415,141

(22) PCT Filed: Dec. 9, 2019

(86) PCT No.: PCT/JP2019/048051
§ 371 (c)(1),
(2) Date: Jun. 17, 2021

(87) PCT Pub. No.: WO2020/129724
PCT Pub. Date: Jun. 25, 2020

(65) Prior Publication Data
US 2022/0056199 A1 Feb. 24, 2022

(30) Foreign Application Priority Data
Dec. 19, 2018 (JP) .................... 2018-236982

(51) Int. Cl.
*C08G 61/02* (2006.01)
*C08G 59/02* (2006.01)
(Continued)

(52) U.S. Cl.
CPC ............. *C08G 61/02* (2013.01); *C08G 59/02* (2013.01); *C08G 59/62* (2013.01); *C08J 5/244* (2021.05); *C08J 5/249* (2021.05)

(58) Field of Classification Search
None
See application file for complete search history.

(56) References Cited

FOREIGN PATENT DOCUMENTS

| JP | S41-14099 B1 | 8/1966 |
| JP | S48-22538 A | 3/1973 |

(Continued)

OTHER PUBLICATIONS

International Preliminary Report on Patentability and Written Opinion of the International Searching Authority dated Mar. 10, 2020, issued for PCT/JP2019/048051.

*Primary Examiner* — Randy P Gulakowski
*Assistant Examiner* — Ha S Nguyen
(74) *Attorney, Agent, or Firm* — Locke Lord LLP; James E. Armstrong, IV; Nicholas J. DiCeglie, Jr.

(57) ABSTRACT

Provided are an epoxy resin composition, which exhibits excellent low dielectric properties, and imparts excellent copper foil peel strength and interlayer cohesive strength when used in printed circuit plate applications; and a phenolic resin or an epoxy resin, which are for forming the epoxy resin composition. The phenolic resin is represented by General Formula (1) below.

(Continued)

[C1]

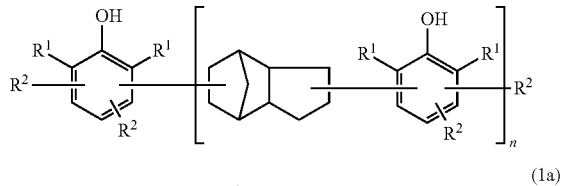

(1)

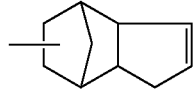

(1a)

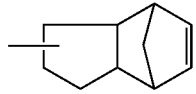

(1b)

In the formula, $R^1$'s each represent a hydrocarbon group having 1 to 10 carbon atoms; $R^2$'s each represent a hydrogen atom, Formula (1a), or Formula (1b), where at least one of $R^2$'s is Formula (1a) or Formula (1b); and n represents the number of repetitions of 0 to 5.

20 Claims, 5 Drawing Sheets

(51) Int. Cl.
  *C08G 59/62* (2006.01)
  *C08J 5/24* (2006.01)
  *C08G 59/06* (2006.01)
  *C08G 59/32* (2006.01)
  *C08L 65/00* (2006.01)
  *C08G 59/08* (2006.01)
  *B32B 27/20* (2006.01)
  *B32B 27/38* (2006.01)
  *H05K 1/03* (2006.01)

(56) References Cited

FOREIGN PATENT DOCUMENTS

| | | | |
|---|---|---|---|
| JP | 48022538 A | * | 3/1978 |
| JP | 05339341 A | * | 12/1993 |
| JP | 2009096819 A | * | 5/2009 |

* cited by examiner

[Fig.1]
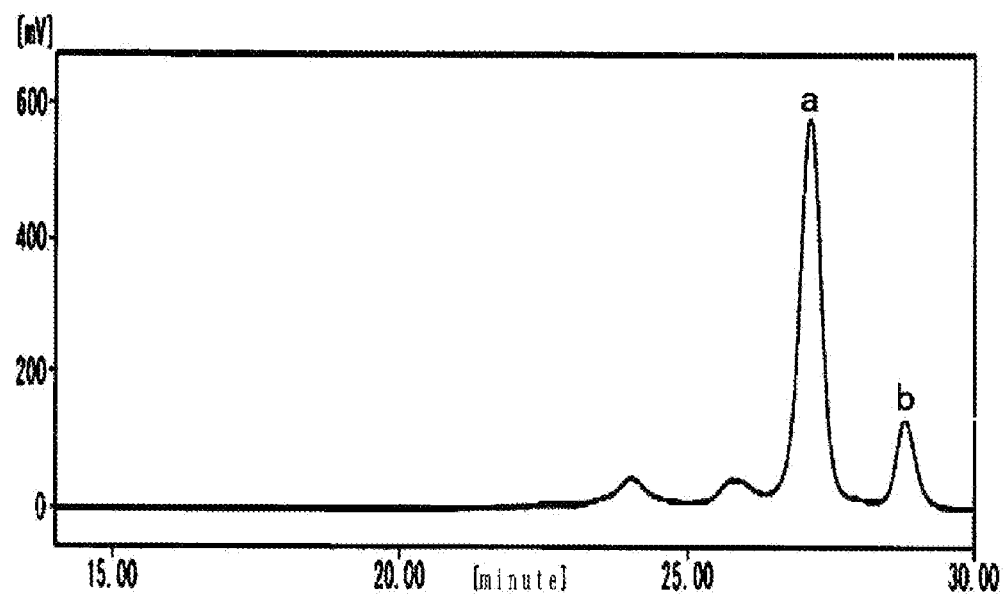
[Fig.2]
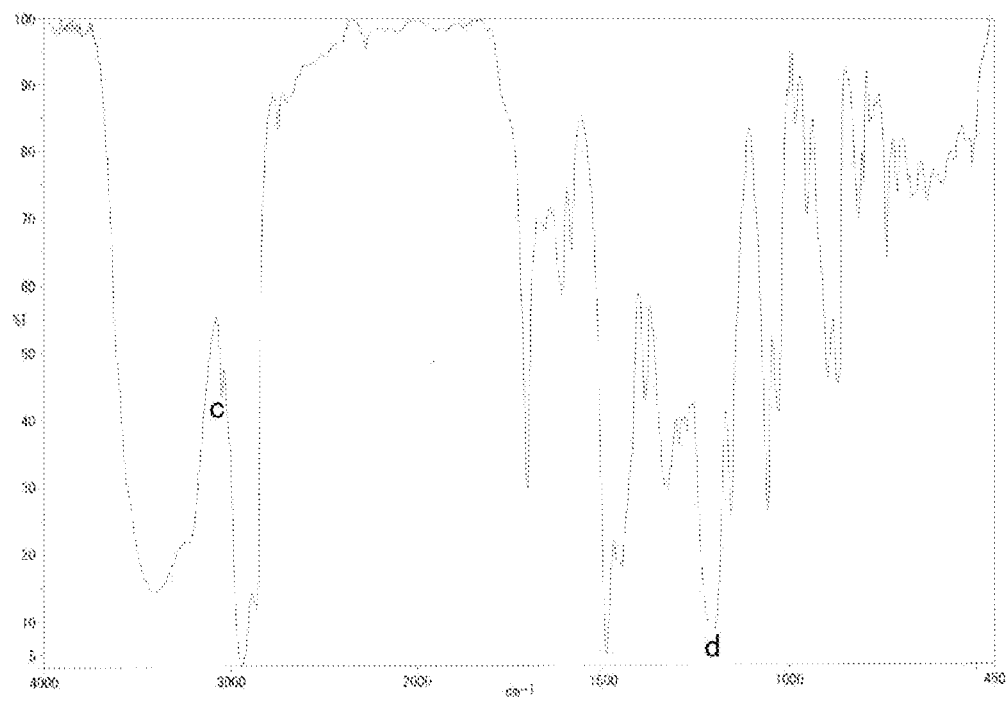

[Fig.3]
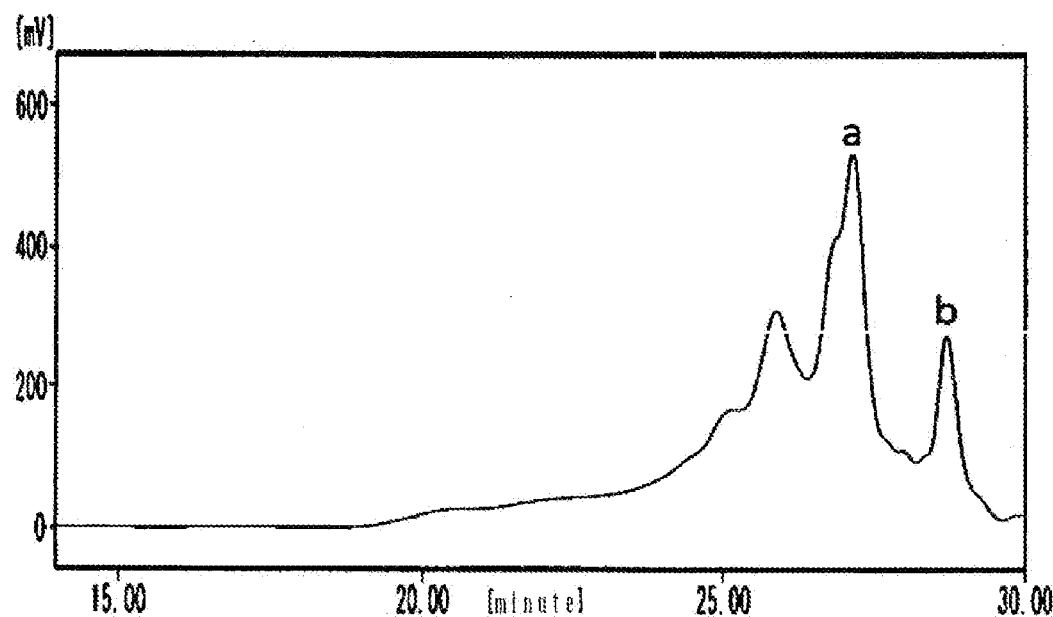
[Fig.4]
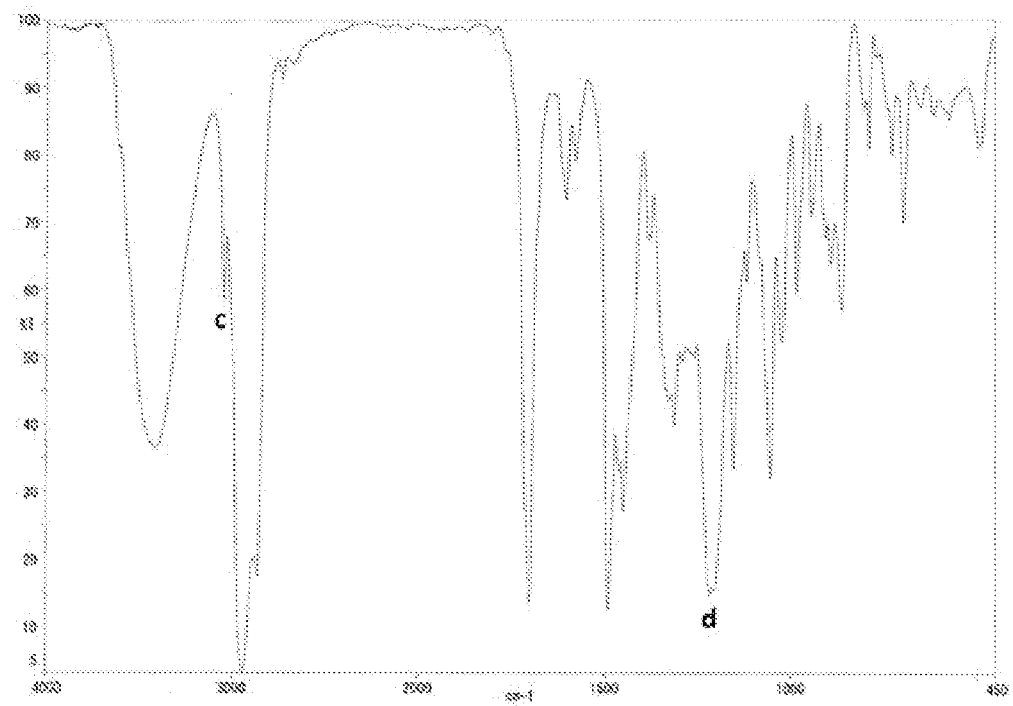

[Fig.5]
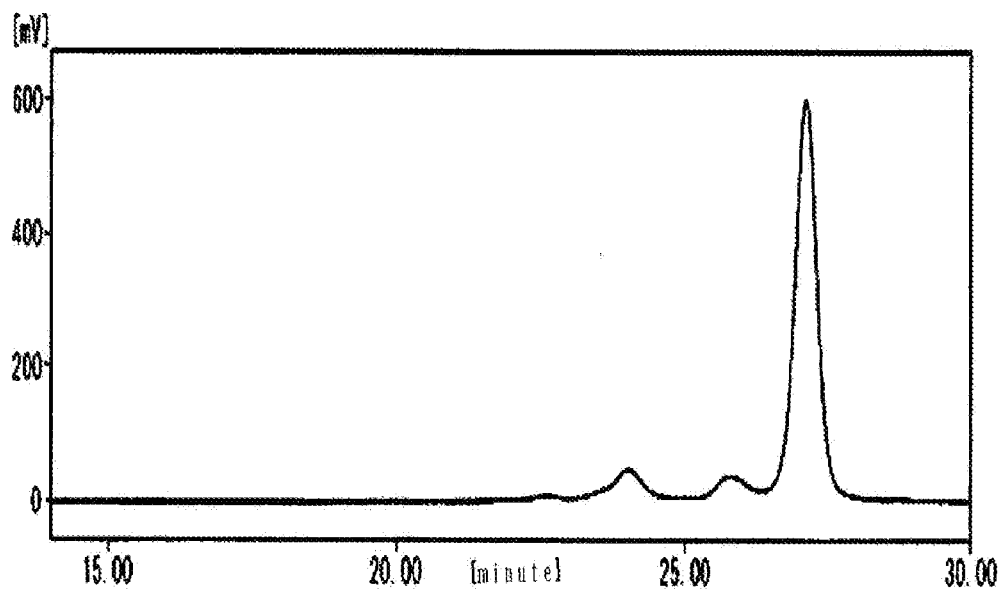
[Fig.6]
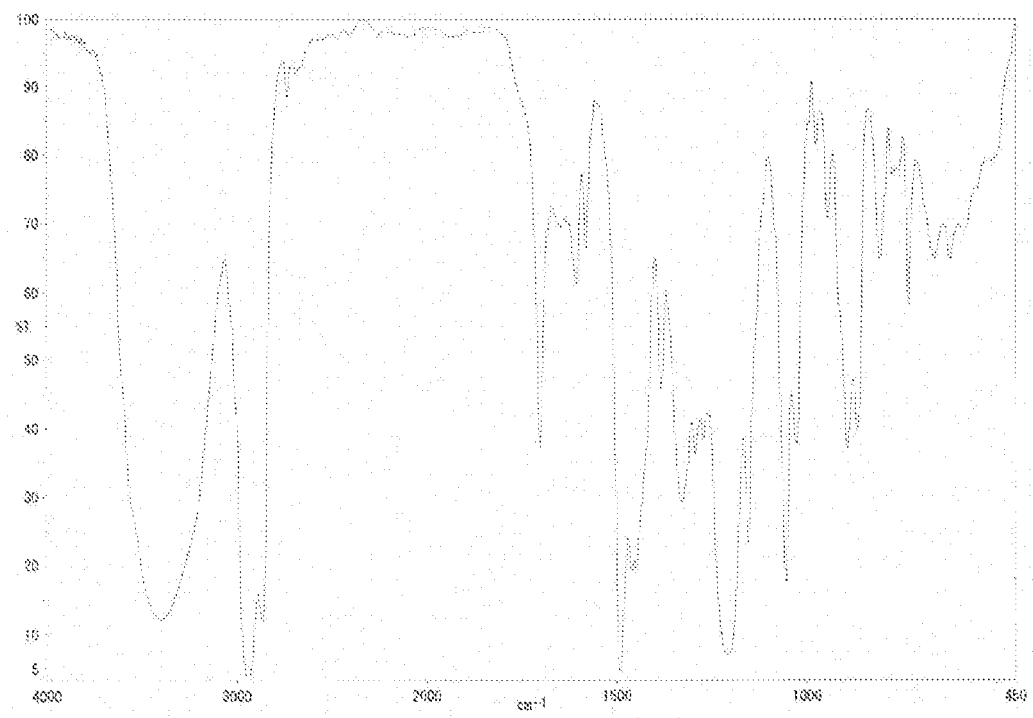

[Fig.7]
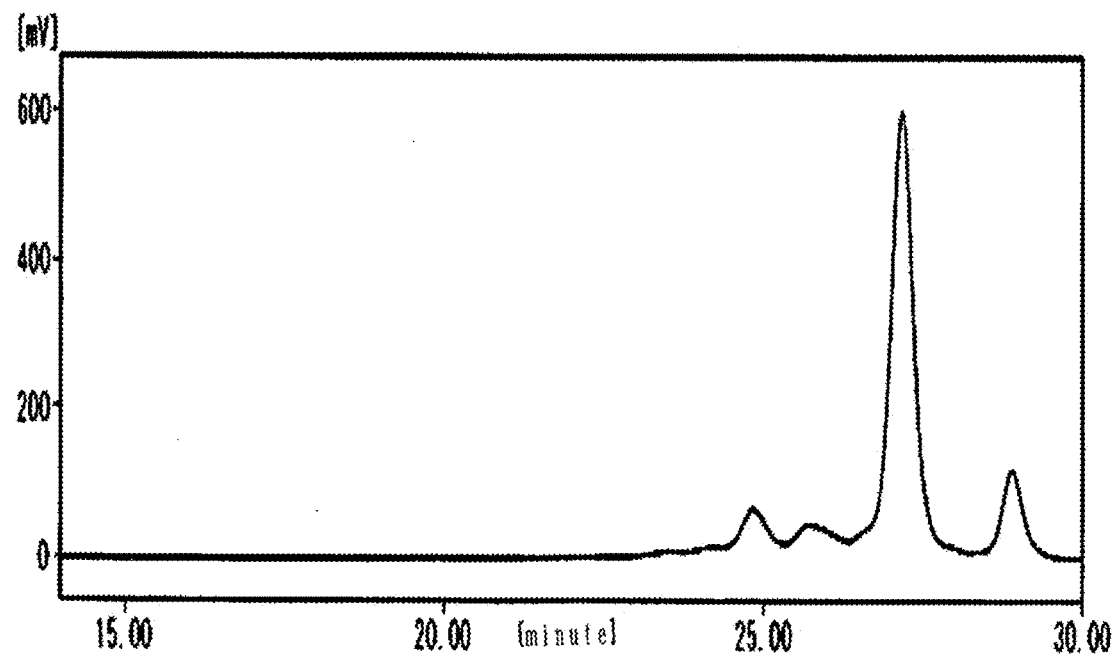
[Fig.8]
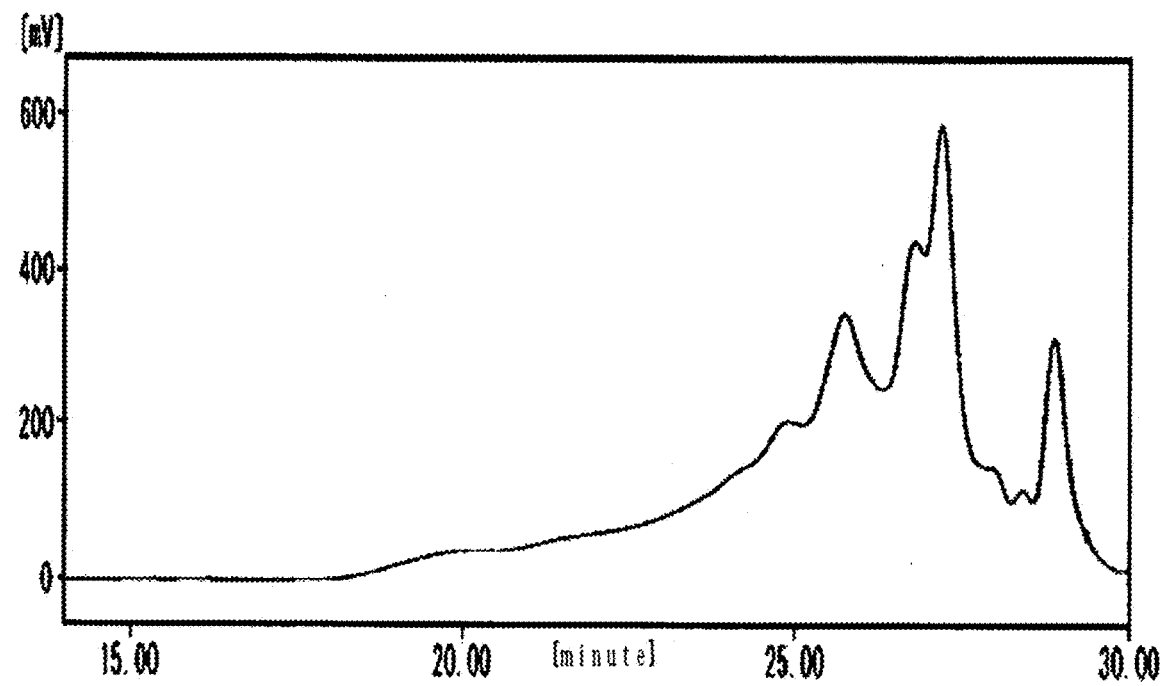

[Fig.9]
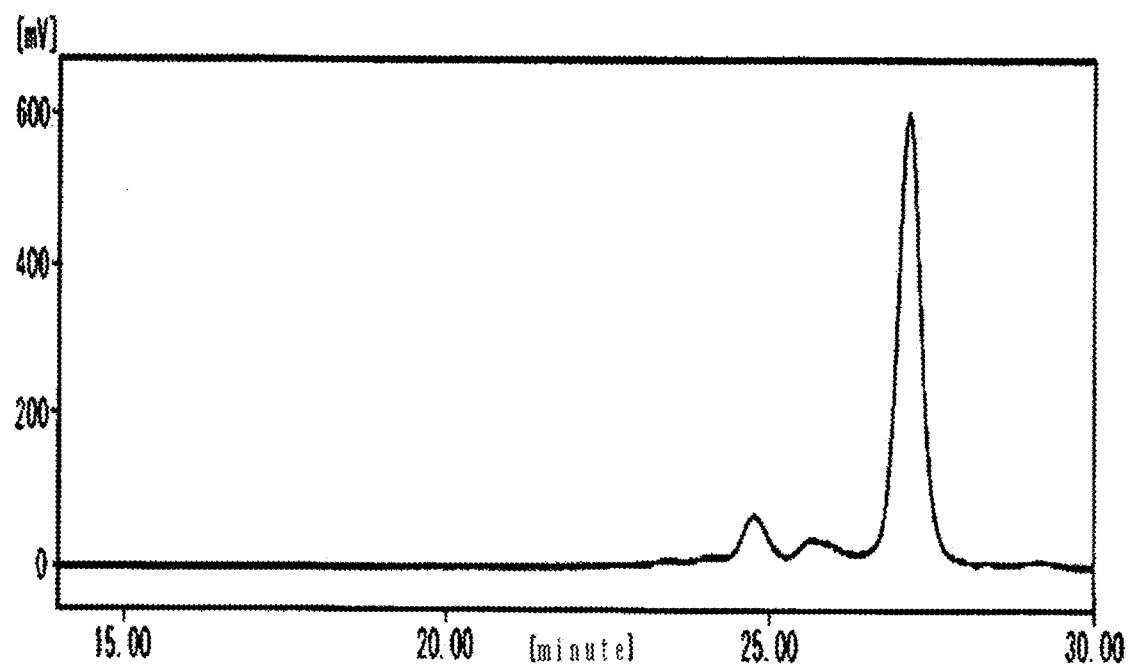

PHENOLIC RESIN, EPOXY RESIN, EPOXY RESIN COMPOSITION AND CURED PRODUCT OF SAME

TECHNICAL FIELD

The present invention relates to a phenolic resin or an epoxy resin, which have excellent low dielectric properties and high adhesiveness; and an epoxy resin composition, an epoxy resin-cured product, a prepreg, a laminated plate, and a printed circuit board, which are formed using the phenolic resin or the epoxy resin.

BACKGROUND ART

Epoxy resins have excellent adhesiveness, flexibility, heat resistance, chemical resistance, insulation properties, and curing reactivity, and thus are widely used in various fields such as paints, adhesion in civil engineering, casting, electrical and electronic materials, and film materials. The epoxy resins are widely used particularly in applications of printed circuit boards, which are one of electrical and electronic materials, by imparting flame retardance to the epoxy resins.

In recent years, as information devices have been rapidly miniaturized and improved in performance, materials used in the fields of semiconductors and electronic components are being required to have a higher performance than ever before. In particular, epoxy resin compositions used as materials for electrical and electronic components are being required to have low dielectric properties, with further reduction in thickness and improvement being sought in function of boards.

As shown in PTL 1 below, a dicyclopentadiene phenolic resin into which an aliphatic skeleton is introduced, and the like have been used for reduction in dielectric for applications of laminated plate usage, but such a resin has been ineffective in lowering a dielectric loss tangent and also unsatisfactory in terms of adhesiveness.

As a resin for achieving a low dielectric loss tangent, an aromatically modified epoxy resin into which an aromatic skeleton is introduced, and the like have been used as shown in PTL 2 below. However, although an excellent dielectric loss tangent is imparted, there is a problem of a deterioration in adhesion force. Therefore, there has been a demand for development of a resin imparting a low dielectric loss tangent and a high adhesion force.

As described above, the epoxy resins disclosed in any of the documents do not sufficiently satisfy the required performance based on the improvement in function of recent years, and are insufficient to ensure low dielectric properties and adhesiveness.

Meanwhile, PTL 3 discloses a 2,6-disubstituted phenol-dicyclopentadiene type resin, but does not disclose a resin in which a plurality of dicyclopentadienes are substituted on a phenol ring.

CITATION LIST

Patent Literature

[PTL 1] Japanese Patent Application Publication No. 2001-240654
[PTL 2] Japanese Patent Application Publication No. 2015-187190
[PTL 3] Japanese Patent Application Publication No. H05-339341

SUMMARY OF INVENTION

Technical Problem

Accordingly, an object to be achieved by the present invention is to provide a curable resin composition exhibiting an excellent dielectric loss tangent in a cured product thereof, and imparting excellent copper foil peel strength and interlayer cohesive strength when used in printed circuit plate applications.

Solution to Problem

In order to achieve the above object, the inventors of the present invention have found that when a phenolic resin, which is obtained by reacting dicyclopentadiene in a specific ratio with 2,6-disubstituted phenols, is cured with an epoxy resin, or when an epoxy resin obtained by epoxidizing this phenolic resin is cured with a curing agent, a cured product thus obtained has excellent low dielectric properties and excellent adhesiveness, and therefore have completed the present invention.

That is, the present invention is a phenolic resin represented by General Formula (1) below.

[C1]

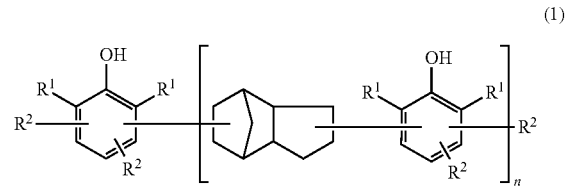

(1)

In the formula, $R^1$'s each independently represent a hydrocarbon group having 1 to 8 carbon atoms; $R^2$'s each independently represent a hydrogen atom, Formula (1a), or Formula (1b) below, where at least one of $R^2$'s is Formula (1a) or Formula (1b); and n represents the number of repetitions, where an average value thereof is a number of 0 to 5.

[C2]

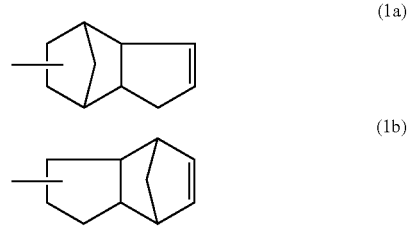

(1a)

(1b)

Furthermore, the present invention is a method for producing the above phenolic resin, the method including reacting dicyclopentadiene, in a ratio of 0.28 to 2 times by mol, with 2,6-disubstituted phenols represented by General Formula (3) below in the presence of a Lewis acid.

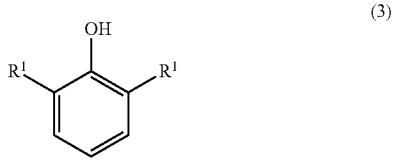

(3)

In the formula, $R^1$'s are synonymous with $R^1$'s in General Formula (1).

Furthermore, the present invention is an epoxy resin represented by General Formula (2) below obtained using the above phenolic resin as a raw material.

[C4]

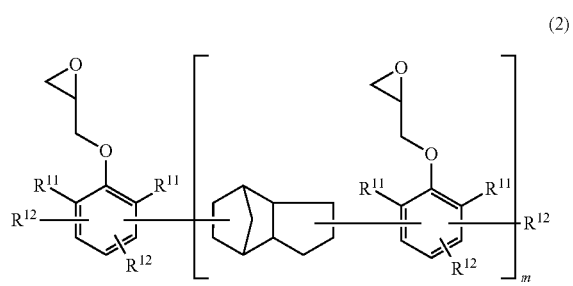

(2)

In the formula, $R^{11}$'s each independently represent a hydrocarbon group having 1 to 8 carbon atoms; $R^{12}$'s each independently represent a hydrogen atom, Formula (1a), or Formula (1b) above, where at least one of $R^{12}$'s is Formula (1a) or Formula (1b) above; and m represents the number of repetitions, where an average value thereof is a number of 0 to 5.

Furthermore, the present invention is an epoxy resin composition containing an epoxy resin and a curing agent. The epoxy resin composition is characterized in that the above phenolic resin and/or the above epoxy resin is used as an indispensable component.

Furthermore, the present invention is a cured product obtained by curing the above epoxy resin composition, and is also a prepreg, a laminated plate, or a printed circuit board, which are formed using the above epoxy resin composition.

Advantageous Effects of Invention

An epoxy resin composition of the present invention provides an epoxy resin composition exhibiting an excellent dielectric loss tangent in a cured product thereof, and imparting excellent copper foil peel strength and interlayer cohesive strength when used in printed circuit plate applications. In particular, it can be suitably used in mobile applications, server applications, and the like, in which a low dielectric loss tangent is strongly required.

BRIEF DESCRIPTION OF DRAWINGS

FIG. 1 is a GPC chart of a phenolic resin obtained in Example 1.
FIG. 2 is an MS chart of the phenolic resin obtained in Example 1.
FIG. 3 is a GPC chart of a phenolic resin obtained in Example 7.
FIG. 4 is an MS chart of the phenolic resin obtained in Example 7.
FIG. 5 is a GPC chart of a phenolic resin obtained in Comparative Example 1.
FIG. 6 is an MS chart of the phenolic resin obtained in Comparative Example 1.
FIG. 7 is a GPC chart of an epoxy resin obtained in Example 11.
FIG. 8 is a GPC chart of an epoxy resin obtained in Example 17.
FIG. 9 is a GPC chart of an epoxy resin obtained in Comparative Example 3.

DESCRIPTION OF EMBODIMENTS

Hereinafter, embodiments of the present invention will be described in detail.

A phenolic resin of the present invention is represented by General Formula (1).

In General Formula (1), $R^1$'s each represent a hydrocarbon group having 1 to 8 carbon atoms, where an alkyl group having 1 to 8 carbon atoms, an aryl group having 6 to 8 carbon atoms, an aralkyl group having 7 or 8 carbon atoms, or an allyl group is preferable. The alkyl group having 1 to 8 carbon atoms may be linear, branched, or cyclic. Examples thereof include, but are not limited to, a methyl group, an ethyl group, a propyl group, an isopropyl group, an n-butyl group, a t-butyl group, a hexyl group, a cyclohexyl group, a methylcyclohexyl group, and the like. Examples of the aryl group having 6 to 8 carbon atoms include, but are not limited to, a phenyl group, a tolyl group, a xylyl group, an ethylphenyl group, and the like. Examples of the aralkyl group having 7 or 8 carbon atoms include, but are not limited to, a benzyl group, an α-methylbenzyl group, and the like. Among these substituents, a phenyl group and a methyl group are preferable, and a methyl group is particularly preferable, from the viewpoint of easy availability and reactivity when forming a cured product.

$R^2$'s each independently represent a hydrogen atom, Formula (1a), or Formula (1b), and at least one of $R^2$'s is Formula (1a) or Formula (1b). It can be said that Formula (1a) and Formula (1b) are dicyclopentadienyl groups derived from dicyclopentadiene.

n is the number of repetitions and indicates a number of 0 or more. An average value (number average) thereof is 0 to 5, is preferably 0.5 to 3, is more preferably 0.5 to 2, and is even more preferably 0.6 to 1.8.

The phenolic resin can be produced by, for example, reacting dicyclopentadiene with 2,6-disubstituted phenols represented by General Formula (3) in the presence of a Lewis acid such as a boron trifluoride-ether catalyst.

Examples of the 2,6-disubstituted phenols include 2,6-dimethylphenol, 2,6-diethylphenol, 2,6-dipropylphenol, 2,6-diisopropylphenol, 2,6-di(n-butyl)phenol, 2,6-di(t-butyl)phenol, 2,6-dihexylphenol, 2,6-dicyclohexylphenol, 2,6-diphenylphenol, 2,6-ditolylphenol, 2,6-dibenzylphenol, 2,6-bis(α-methylbenzyl)phenol, 2-ethyl-6-methylphenol, 2-allyl-6-methylphenol, 2-tolyl-6-phenylphenol, and the like, but from the viewpoint of easy availability and reactivity when forming a cured product, 2,6-diphenylphenol and 2,6-dimethylphenol are preferable, and 2,6-dimethylphenol is particularly preferable.

A catalyst used in the above reaction is a Lewis acid. Specific examples thereof include boron trifluoride, a boron trifluoride-phenol complex, a boron trifluoride-ether complex, aluminum chloride, tin chloride, zinc chloride, iron chloride, and the like. Among them, a boron trifluoride-ether complex is preferable because of its ease of handling. A usage amount of the catalyst in the case of a boron trifluoride-ether complex is 0.001 to 20 parts by mass and is preferably 0.5 to 10 parts by mass with respect to 100 parts by mass of dicyclopentadiene.

A reaction method for introducing a dicyclopentadiene structure represented by Formula (1a) or Formula (1b) into 2,6-disubstituted phenols is a method of reacting dicyclopentadiene in a predetermined ratio with 2,6-disubstituted phenol in which dicyclopentadiene may be added in a plurality of stages (sequential addition in two or more separate stages) to be reacted intermittently. In a general reaction, a ratio of dicyclopentadiene to 2,6-disubstituted phenol is 0.1 to 0.25 times by mol, but in the present invention, it is 0.28 to 2 times by mol. In a case where dicyclopentadiene is continuously added and reacted, a ratio of dicyclopentadiene to 2,6-disubstituted phenol is 0.25 to 1 times by mol, is preferably 0.28 to 1 times by mol, and is more preferably 0.3 to 0.5 times by mol. In a case where dicyclopentadiene is sequentially added in separate stages and reacted, an overall ratio thereof is preferably 0.8 to 2 times by mol and is more preferably 0.9 to 1.7 times by mol. A ratio of dicyclopentadiene used at each stage is preferably 0.28 to 1 times by mol.

Mass spectrometry and FT-IR measurement can be used as a method of confirming whether the substituent represented by Formula (1a) or Formula (1b) has been introduced into the phenolic resin represented by General Formula (1).

In a case where mass spectrometry is used, it is possible to use electrospray ionization-mass spectrometry (ESI-MS), field desorption mass spectroscopy (FD-MS), and the like. Whether the substituent represented by Formula (1a) or Formula (1b) has been introduced can be confirmed by subjecting a sample, which has been obtained by separating components having different numbers of rings by GPC or the like, to mass spectrometry.

In a case of using an FT-IR measurement method, a sample dissolved in an organic solvent such as THF is applied onto KRS-5 cells, and when the cells with a thin film of the sample which are obtained by drying the organic solvent are measured by FT-IR, a peak derived from C—O stretching vibrations in a phenol ring appears near 1210 $cm^{-1}$, and only in a case in which Formula (1a) or Formula (1b) has been introduced, a peak derived from C—H stretching vibrations of an olefin moiety of a dicyclopentadiene skeleton appears near 3040 $cm^{-1}$. When a line obtained by linear connection between the beginning and the end of a target peak is taken as a baseline, and a length from the peak top to the baseline is taken as a peak height, an amount of Formula (1a) or Formula (1b) introduced can be quantitatively determined from a ratio $(A_{3040}/A_{1210})$ between the peak $(A_{3040})$ near 3040 $cm^{-1}$ and the peak $(A_{1210})$ near 1210 $cm^{-1}$. It has been confirmed that as this ratio becomes larger, physical property values become more favorable. A preferable ratio $(A_{3040}/A_{1210})$ for satisfying desired physical properties is 0.05 or more, and is more preferably 0.1 or more.

For this reaction, a method, in which 2,6-disubstituted phenols and a catalyst are put into a reactor, and dicyclopentadiene is added dropwise thereinto over 1 to 10 hours, is preferable.

A reaction temperature is preferably 50° C. to 200° C., is more preferably 100° C. to 180° C., and is even more preferably 120° C. to 160° C. A reaction time is preferably 1 to 10 hours, is more preferably 3 to 10 hours, and is even more preferably 4 to 8 hours.

After completion of the reaction, an alkali such as sodium hydroxide, potassium hydroxide, and calcium hydroxide is added to deactivate the catalyst. Thereafter, a solvent such as aromatic hydrocarbons (such as toluene and xylene) and ketones (such as methyl ethyl ketone and methyl isobutyl ketone) is added for dissolution, and washed with water. Thereafter, the solvent is recovered under reduced pressure, and thereby a desired phenolic resin can be obtained. It is preferable to react the entire amount of dicyclopentadiene as far as possible, but to leave some 2,6-disubstituted phenols unreacted, and leave preferably 10% or less thereof unreacted, to be recovered under reduced pressure.

In the reaction, the following solvents may be used as necessary: solvents such as aromatic hydrocarbons such as benzene, toluene, and xylene; halogenated hydrocarbons such as chlorobenzene and dichlorobenzene; and ethers such as ethylene glycol dimethyl ether and diethylene glycol dimethyl ether.

An epoxy resin of the present invention is represented by General Formula (2). This epoxy resin can be obtained by reacting the above-described phenolic resin with epihalohydrins such as epichlorohydrin. This reaction is carried out according to a conventionally known method.

In the epoxy resin represented by General Formula (2) obtained by epoxidizing the phenolic resin represented by General Formula (1), $R^{11}$'s are each independently a hydrocarbon group having 1 to 8 carbon atoms. Examples of hydrocarbon groups include those exemplified for $R^1$'s in General Formula (1), and the same applies to their preferable examples. $R^{12}$'s each independently represent a hydrogen atom, Formula (1a), or Formula (1b), and at least one of $R^{12}$'s is Formula (1a) or Formula (1b).

m is the number of repetitions and indicates a number of 0 or more. An average value (number average) thereof is 0 to 5, is preferably 0.5 to 2, and is more preferably 0.6 to 1.

A method of epoxidation is implemented as follows, for example: an alkali metal hydroxide, such as sodium hydroxide, in the form of a solid or a concentrated aqueous solution is added to a mixture of the phenolic resin and an excess molar amount of epihalohydrin with respect to hydroxyl groups of the phenolic resin, and the resultant product is reacted at a reaction temperature of 30° C. to 120° C. for 0.5 to 10 hours; or alternatively, a quaternary ammonium salt, such as tetraethylammonium chloride, as a catalyst is added to the phenolic resin and an excess molar amount of epihalohydrin and reacted at a temperature of 50° C. to 150° C. for 1 to 5 hours to obtain a polyhalohydrin ether, and an alkali metal hydroxide, such as sodium hydroxide, in the form of a solid or a concentrated aqueous solution is added to this polyhalohydrin ether and reacted at a temperature of 30° C. to 120° C. for 1 to 10 hours.

In the above reaction, a usage amount of the epihalohydrin is 1 to 20 times by mol and is preferably 4 to 8 times by mol with respect to the hydroxyl groups of the phenolic resin. Furthermore, a usage amount of the alkali metal hydroxide is 0.85 to 1.1 times by mol with respect to the hydroxyl groups of the phenolic resin.

Since the epoxy resin obtained by these reactions contains unreacted epihalohydrin and an alkali metal halide, a desired epoxy resin can be obtained by removing the unreacted epihalohydrin from a reaction mixture through evaporation, and by further removing the alkali metal halide by a method of extraction with water, separation by filtration, or the like.

An epoxy equivalent (g/eq.) of the epoxy resin of the present invention is preferably 244 to 3,700, is more preferably 260 to 2,000, and is even more preferably 270 to 700. In particular, in a case where dicyandiamide is used as a curing agent, an epoxy equivalent is preferably 300 or more to prevent crystals of dicyandiamide from precipitating on a prepreg.

A molecular weight distribution of the epoxy resin obtained by the production method of the present invention can be changed by changing a formulation ratio of the phenolic resin and epihalohydrin in an epoxidation reaction. As a usage amount of epihalohydrin becomes closer to an equimolar amount with respect to the hydroxyl groups of the phenolic resin, a molecular weight distribution becomes higher, whereas as a usage amount thereof becomes closer to 20 times by mol, a molecular weight distribution becomes lower. Furthermore, it is also possible to increase a molecular weight of the obtained epoxy resin by causing the phenolic resin to react therewith again.

By using such an epoxy resin, an epoxy resin composition of the present invention can be obtained.

The epoxy resin composition of the present invention contains an epoxy resin and a curing agent as indispensable components. Aspects thereof include an aspect in which both of the curing agent and the epoxy resin are the phenolic resin of the present invention and the epoxy resin of the present invention, and an aspect in which one of the curing agent and the epoxy resin is the phenolic resin of the present invention or the epoxy resin of the present invention.

At least 30% by mass of the curing agent is preferably the phenolic resin represented by General Formula (1), or at least 30% by mass of the epoxy resin is preferably the epoxy resin represented by General Formula (2), and it is more preferable that 50% by mass or more thereof be contained. In a case where an amount of the phenolic resin or the epoxy resin is less than the above ranges, dielectric properties may deteriorate.

As the epoxy resin used to obtain the epoxy resin composition of the present invention, the epoxy resin of the present invention may be used alone, or one or two or more kinds of various epoxy resins may be used in combination with the epoxy resin of the present invention as necessary.

In a case where these epoxy resins are used in combination, an amount of an epoxy resin used in combination with respect to a total amount of epoxy resins is preferably 70% by mass or less, and is more preferably 50% by mass or less. When an amount of the epoxy resin used in combination is too large, dielectric properties of the epoxy resin composition may deteriorate.

Furthermore, in a case of using the phenolic resin of the present invention, only an epoxy resin other than the epoxy resin of the present invention may be used therewith.

As the epoxy resin used in combination or the other epoxy resin, it is possible to use any of commonly used epoxy resins having two or more epoxy groups in a molecule. Examples thereof include, but are not limited to, a bisphenol A type epoxy resin, a bisphenol F type epoxy resin, a tetramethyl bisphenol F type epoxy resin, a hydroquinone type epoxy resin, a biphenyl type epoxy resin, a bisphenol fluorene type epoxy resin, a bisphenol S type epoxy resin, a bisthioether type epoxy resin, a resorcinol type epoxy resin, a biphenyl aralkyl phenol type epoxy resin, a naphthalenediol type epoxy resin, a phenol novolac type epoxy resin, a styrenated phenol novolac type epoxy resin, a cresol novolac type epoxy resin, an alkyl novolac type epoxy resin, a bisphenol novolac type epoxy resin, a naphthol novolac type epoxy resin, a β-naphthol aralkyl type epoxy resin, a dinaphthol aralkyl type epoxy resin, an α-naphthol aralkyl type epoxy resin, a triphenylmethane type epoxy resin, a triphenylmethane type epoxy resin, a dicyclopentadiene type epoxy resin other than that of the present invention, an alkylene glycol type epoxy resin, an aliphatic cyclic epoxy resin, diaminodiphenylmethane tetraglycidylamine, an aminophenol type epoxy resin, a phosphorus-containing epoxy resin, a urethane-modified epoxy resin, and an oxazolidone ring-containing epoxy resin. Furthermore, these epoxy resins may be used alone or in combination of two or more kinds thereof. From the viewpoint of easy availability, it is more preferable to use a naphthalenediol type epoxy resin, a phenol novolac type epoxy resin, an aromatically modified phenol novolac type epoxy resin, a cresol novolac type epoxy resin, an α-naphthol aralkyl type epoxy resin, a dicyclopentadiene type epoxy resin, a phosphorus-containing epoxy resin, and an oxazolidone ring-containing epoxy resin.

As the curing agent, in addition to the above-mentioned dicyclopentadiene type phenolic resin, as necessary, one kind of commonly used curing agents such as various phenolic resins, acid anhydrides, amines, hydrazides, and acidic polyesters may be used, or two or more kinds thereof may be used in combination. In a case where these curing agents are used in combination, an amount of a curing agent used in combination with respect to a total amount of curing agents is preferably 70% by mass or less, and is more preferably 50% by mass or less. When a proportion of the curing agent used in combination is too large, dielectric properties and adhesion properties of the epoxy resin composition may deteriorate.

Furthermore, in a case of using the epoxy resin of the present invention, only a phenolic resin other than the phenolic resin of the present invention may be used therewith.

In the epoxy resin composition of the present invention, a molar ratio of an active hydrogen group of the curing agent is preferably 0.2 to 1.5 mol, is more preferably 0.3 to 1.4 mol, is even more preferably 0.5 to 1.3 mol, and is particularly preferably 0.8 to 1.2 mol, with respect to 1 mol of epoxy groups of the total epoxy resins. In a case where the moral ratio falls outside of this range, curing may be incomplete, and favorable cured physical properties may not be obtained. For example, in a case of using a phenolic resin-based curing agent or an amine-based curing agent, approximately equimolar amounts of active hydrogen groups with respect to epoxy groups are incorporated. In a case of using an acid anhydride-based curing agent, 0.5 to 1.2 mol of acid anhydride groups, preferably 0.6 to 1.0 mol thereof is incorporated with respect to 1 mol of epoxy groups. In a case of using the phenolic resin of the present invention alone as a curing agent, it is desirable to use it within a range of 0.9 to 1.1 mol with respect to 1 mol of epoxy resins.

The active hydrogen group referred to in the present invention means a functional group having active hydrogen that is reactive with an epoxy group (including a functional group having latent active hydrogen that produces active hydrogen by hydrolysis or the like, and a functional group exhibiting an equivalent curing action). Specific examples thereof include an acid anhydride group, a carboxyl group, an amino group, a phenolic hydroxyl group, and the like. Regarding the active hydrogen group, 1 mol of carboxyl groups and 1 mol of phenolic hydroxyl groups are calculated as 1 mol, and an amino group (NI-12) is calculated as 2 mol. In a case where it is not clear which groups are active hydrogen group, an active hydrogen equivalent can be obtained by measurement. For example, an active hydrogen equivalent of a curing agent used can be obtained by reacting a monoepoxy resin such as phenyl glycidyl ether having a known epoxy equivalent with a curing agent having an unknown active hydrogen equivalent, and measuring an amount of the monoepoxy resin consumed.

Specific examples of the phenolic resin-based curing agent that can be used in the epoxy resin composition of the present invention include bisphenols such as bisphenol A, bisphenol F, bisphenol C, bisphenol K, bisphenol Z, bisphenol S, tetramethyl bisphenol A, tetramethyl bisphenol F, tetramethyl bisphenol S, tetramethyl bisphenol Z, dihydroxydiphenyl sulfide, and 4,4'-thiobis(3-methyl-6-t-butylphenol); dihydroxybenzenes such as catechol, resorcinol, methylresorcinol, hydroquinone, monomethylhydroquinone, dimethylhydroquinone, trimethylhydroquinone, mono-t-butylhydroquinone, and di-t-butylhydroquinone; hydroxynaphthalenes such as dihydroxynaphthalene, dihydroxymethylnaphthalene, and trihydroxynaphthalene; phosphorus-containing phenol curing agents such as LC-950PM60 (manufactured by SHIN-A T&C); phenols such a phenol novolac resin such as Shonol BRG-555 (manufactured by Aica Kogyo Company, Limited), a cresol novolac resin such as DC-5 (manufactured by NIPPON STEEL Chemical & Material Co., Ltd.), an aromatically modified phenol novolac resin, a bisphenol A novolac resin, a trishydroxyphenylmethane type novolac resin such as RESITOP TPM-100 (manufactured by Gun Ei Chemical Industry Co., Ltd.), and a naphthol novolac resin; condensates of naphthols and/or bisphenols with aldehydes; phenols such as SN-160, SN-395, and SN-485 (manufactured by NIPPON STEEL Chemical & Material Co., Ltd.); phenol compounds referred to as so-called phenol novolac resins such as condensates of naphthols and/or bisphenols with xylylene glycol, condensates of phenols and/or naphthols with isopropenyl acetophenone, reactants of phenols, naphthols, and/or bisphenols with dicyclopentadiene, and condensates of phenols, naphthols and/or bisphenols with biphenyl-based crosslinking agents; and the like. From the viewpoint of easy availability, a phenol novolac resin, a dicyclopentadiene type phenolic resin, a trishydroxyphenylmethane type novolac resin, an aromatically modified phenol novolac resin, and the like are preferable.

In the case of phenol novolac resins, examples of phenols include phenol, cresol, xylenol, butylphenol, amylphenol, nonylphenol, butyl methylphenol, trimethylphenol, phenylphenol, and the like; and examples of naphthols include 1-naphthol, 2-naphthol, and the like. In addition, the above-described bisphenols are included. Examples of aldehydes include formaldehyde, acetaldehyde, propylaldehyde, butyraldehyde, valeraldehyde, capronaldehyde, benzaldehyde, chloraldehyde, bromoaldehyde, glyoxal, malonaldehyde, succinaldehyde, glutaraldehyde, adipic aldehyde, pimelaldehyde, sebacaldehyde, acrolein, crotonaldehyde, salicylaldehyde, phthalaldehyde, hydroxybenzaldehyde, and the like. Examples of biphenyl-based crosslinking agents include bis(methylol)biphenyl, bis(methoxymethyl)biphenyl, bis(ethoxymethyl)biphenyl, bis(chloromethyl)biphenyl, and the like.

Specific examples of acid anhydride-based curing agents include methyltetrahydrophthalic anhydride, hexahydrophthalic anhydride, pyromellitic anhydride, phthalic anhydride, trimellitic anhydride, methyl nadic acid, and the like.

Specific examples of amine-based curing agents include amine compounds such as diethylenetriamine, triethylenetetramine, meta-xylylenediamine, isophorone diamine, diaminodiphenylmethane, diaminodiphenyl sulfone, diaminodiphenyl ether, benzyldimethylamine, 2,4,6-tris(dimethylaminomethyl)phenol, dicyandiamide, polyamide amine, which is a condensate of acids such as dimer acid and polyamines, and the like.

Specific examples of other curing agents include phosphine compounds such as triphenylphosphine; phosphonium salts such as tetraphenylphosphonium bromide; imidazoles such as 2-methylimidazole, 2-phenylimidazole, 2-ethyl-4-methylimidazole, 2-undecylimidazole, and 1-cyanoethyl-2-methylimidazole; imidazole salts which are salts of imidazoles and trimellitic acid, isocyanuric acid, boron, or the like; quaternary ammonium salts such as trimethylammonium chloride; diazabicyclo compounds; salts of diazabicyclo compounds and phenols, phenol novolac resins, or the like; complex compounds of boron trifluoride and amines, ether compounds, or the like; aromatic phosphonium; iodonium salts; and the like.

A curing accelerator can be used for the epoxy resin composition as necessary. Examples of curing accelerators that can be used include imidazoles such as 2-methylimidazole, 2-ethylimidazole, and 2-ethyl-4-methylimidazole; tertiary amines such as 2-(dimethylaminomethyl)phenol and 1,8-diazabicyclo(5,4,0)undec-7-ene; phosphines such as triphenylphosphine, tricyclohexylphosphine, and triphenylphosphine triphenylborane; and metallic compounds such as stannous octoate. In a case of using the curing accelerator, its usage amount is preferably 0.02 to 5 parts by mass with respect to 100 parts by mass of epoxy resin components in the epoxy resin composition of the present invention. By using the curing accelerator, a curing temperature can be lowered, and a curing time can be shortened.

For the epoxy resin composition, an organic solvent or a reactive diluent can be used for adjusting a viscosity.

Examples of organic solvents include, but are not limited to, amides such as N,N-dimethylformamide, and N,N-dimethylacetamide; ethers such as ethylene glycol monomethyl ether, dimethoxydiethylene glycol, ethylene glycol diethyl ether, diethylene glycol diethyl ether, and triethylene glycol dimethyl ether; ketones such as acetone, methyl ethyl ketone, methyl isobutyl ketone, and cyclohexanone; alcohols such as methanol, ethanol, 1-methoxy-2-propanol, 2-ethyl-1-hexanol, benzyl alcohol, ethylene glycol, propylene glycol, butyldiglycol, and pine oil; acetic acid esters such as butyl acetate, methoxybutyl acetate, methyl cellosolve acetate, cellosolve acetate, ethyl diglycol acetate, propylene glycol monomethyl ether acetate, carbitol acetate, and benzyl alcohol acetate; benzoic acid esters such as methyl benzoate, and ethyl benzoate; cellosolves such as methyl cellosolve, cellosolve, and butyl cellosolve; carbitols such as methyl carbitol, carbitol, and butyl carbitol; aromatic hydrocarbons such as benzene, toluene, and xylene; dimethyl sulfoxide; acetonitrile; N-methylpyrrolidone; and the like.

Examples of reactive diluents include, but are not limited to, monofunctional glycidyl ethers such as allyl glycidyl ether, butyl glycidyl ether, 2-ethylhexyl glycidyl ether, phenyl glycidyl ether, and glycidyl tolyl ether; bifunctional glycidyl ethers such as resorcinol diglycidyl ether, neopentyl glycol diglycidyl ether, 1,4-butanediol diglycidyl ether, 1,6-hexanediol diglycidyl ether, cyclohexanedimethanol diglycidyl ether, and propylene glycol diglycidyl ether; polyfunctional glycidyl ethers such as glycerol polyglycidyl ether, trimethylolpropane polyglycidyl ether, trimethylolethane polyglycidyl ether, and pentaerythritol polyglycidyl ether; glycidyl esters such as glycidyl ester of neodecanoic acid; and glycidylamines such as phenyldiglycidylamine and tolyldiglycidylamine.

It is preferable to use one kind or a mixture of a plurality of kinds of these organic solvents or reactive diluents in an amount of 90% by mass or less as a non-volatile content, and the appropriate type and a usage amount thereof are appropriately selected depending on usage applications. For example, for applications of a printed circuit plate, a polar solvent having a boiling point of 160° C. or lower, such as methyl ethyl ketone, acetone, and 1-methoxy-2-propanol, is preferable, and a usage amount thereof is preferably 40% to 80% by mass in terms of non-volatile content. For adhesive film usage applications, it is preferable to use, for example, ketones, acetic acid esters, carbitols, aromatic hydrocarbons, dimethylformamide, dimethylacetamide, N-methylpyrrolidone, and the like, and a usage amount thereof is preferably 30% to 60% by mass in terms of non-volatile content.

Other thermosetting resins and thermoplastic resins may be blended in the epoxy resin composition as long as its characteristics are not impaired. Examples thereof include, but are not limited to, phenolic resins, acrylic resins, petroleum resins, indene resins, coumarone-indene resins, phenoxy resins, polyurethane resins, polyester resins, polyamide resins, polyimide resins, polyamide-imide resins, polyetherimide resins, polyphenylene ether resins, modified polyphenylene ether resins, polyethersulfone resins, polysulfone resins, polyetheretherketone resins, polyphenylene sulfide resins, polyvinyl formal resins, and the like.

Various known flame retardants can be used in the epoxy resin composition for the purpose of improving flame retardance of a cured product to be obtained. Examples of flame retardants that can be used include halogen-based flame retardants, phosphorus-based flame retardants, nitrogen-based flame retardants, silicone-based flame retardants, inorganic flame retardants, organometallic salt-based flame retardants, and the like. From the viewpoint of the environment, flame retardants not containing halogen are preferable, and phosphorus-based flame retardants are particularly preferable. These flame retardants may be used alone or in combination of two or more kinds thereof.

As the phosphorus-based flame retardants, it is possible to use any of inorganic phosphorus-based compounds or organic phosphorus-based compounds. Examples of inorganic phosphorus-based compounds include ammonium phosphates such as red phosphorus, monoammonium phosphate, diammonium phosphate, triammonium phosphate, and ammonium polyphosphate; and nitrogen-containing inorganic phosphorus compounds such as phosphoric acid amide. Examples of organic phosphorus-based compounds include esters of condensed phosphoric acids such as aliphatic esters of phosphoric acid, and phosphoric acid compounds, for example, PX-200 (manufactured by DAIHACHI CHEMICAL INDUSTRY CO., LTD.); general-purpose organic phosphorus-based compounds such as phosphonic acid compounds, phosphinic acid compounds, phosphine oxide compounds, phosphorane compounds, and nitrogen-containing organic phosphorus compounds; metal salts of phosphinic acid; cyclic organic phosphorus compounds such as 9,10-dihydro-9-oxa-10-phosphaphenanthrene-10-oxide, 10-(2,5-dihydroxyphenyl)-10H-9-oxa-10-phosphaphenanthrene-10-oxide, and 10-(2,7-dihydroxynaphthyl)-10H-9-oxa-10-phosphaphenanthrene-10-oxide; phosphorus-containing epoxy resins and phosphorus-containing curing agents, which are derivatives obtained by reacting the above examples with compounds such as epoxy resin and phenol resin; and the like.

A formulation amount of the flame retardant is appropriately selected depending on the type of phosphorus-based flame retardant, components of the epoxy resin composition, and a desired degree of flame retardance. For example, a content of phosphorus in organic components (excluding an organic solvent) in the epoxy resin composition is preferably 0.2% to 4% by mass, is more preferably 0.4% to 3.5% by mass, and is even more preferably 0.6% to 3% by mass. When a content of phosphorus is small, it may be difficult to ensure flame retardance, whereas when it is too large, this may adversely affect heat resistance. Furthermore, in a case of using a phosphorus-based flame retardant, a flame retardant auxiliary agent such as magnesium hydroxide may be used in combination.

A filling material can be used in the epoxy resin composition as necessary. Specific examples thereof include fused silica, crystalline silica, alumina, silicon nitride, aluminum hydroxide, boehmite, magnesium hydroxide, talc, mica, calcium carbonate, calcium silicate, calcium hydroxide, magnesium carbonate, barium carbonate, barium sulfate, boron nitride, carbon, carbon fibers, glass fibers, alumina fibers, alumina silica fibers, silicon carbide fibers, polyester fibers, cellulose fibers, aramid fibers, ceramic fibers, fine particle rubber, thermoplastic elastomer, pigments, and the like. The general reason for using a filling material is to achieve an effect of improving impact resistance. Furthermore, an effect of improving flame retardance is obtained in a case of using metal hydroxides, such as aluminum hydroxide, boehmite, and magnesium hydroxide, which act as a flame retardant auxiliary agent. A formulation amount of these filling materials is preferably 1% to 150% by mass, and is more preferably 10% to 70% by mass, with respect to a total amount of the epoxy resin composition. When a formulation amount thereof is large, adhesiveness required for laminated plate usage applications may deteriorate, and furthermore, a cured product may become brittle, making it difficult to obtain sufficient mechanical properties. Furthermore, when a formulation amount thereof is small, there is a possibility that an effect of incorporating a filler, such as improvement in impact resistance of a cured product, may not be obtained.

In a case where the epoxy resin composition is formed into a plate-shaped substrate and the like, preferable examples of filling materials include fibrous filling materials from the viewpoint of their dimensional stability, bending strength, and the like. More preferable examples thereof include a glass fiber substrate obtained by weaving glass fibers in a mesh shape.

The epoxy resin composition can further contain various kinds of additives such as silane coupling agents, antioxidants, mold release agents, defoamers, emulsifiers, thixotropy imparting agents, smoothing agents, flame retardants, and pigments, as necessary. A formulation amount of these additives is preferably within a range of 0.01% to 20% by mass with respect to the epoxy resin composition.

It is possible to create a prepreg used for printed circuit plates and the like by impregnating a fibrous base material with the epoxy resin composition. As the fibrous base material, it is possible to use woven fabric or non-woven fabric made of inorganic fibers such as glass, or organic fibers of polyester resins, polyamine resins, polyacrylic resins, polyimide resins, and aromatic polyamide resins, but there is no limitation. A method for manufacturing a prepreg from the epoxy resin composition is not particularly limited. For example, a prepreg is obtained by impregnating a base material with resin varnish created by adjusting a viscosity of the epoxy resin composition with an organic solvent, and then drying the resin varnish by heating to semi-cure (B-stage) the resin component. The drying by heating can be performed, for example, at 100° C. to 200° C. for 1 to 40 minutes. An amount of the resin in the prepreg is preferably 30% to 80% by mass with respect to the resin content.

Furthermore, in order to cure the prepreg, it is possible to use a method of curing a laminated plate which is a method generally used in manufacturing a printed circuit plate, but the method is not limited thereto. For example, in a case of forming a laminated plate using a prepreg, one or a plurality of sheets of prepregs are laminated, pieces of metal foil are disposed on one side or both sides thereof to form a laminate, and this laminate is heated and pressurized to become integrated by lamination. As the metal foil, it is possible to use metal foil formed of one kind of metal such as copper, aluminum, brass, and nickel; of alloys thereof; or of metal composites. Then, the created laminate is heated under pressure to cure the prepregs, and thereby a laminated plate can be obtained. In this case, it is preferable that a heating temperature be 160° C. to 220° C., a pressurization pressure be 50 to 500 N/cm$^2$, and a heating and pressurizing time be 40 to 240 minutes, and thereby a desired cured product can be obtained. When a heating temperature is low, the curing reaction does not proceed sufficiently; whereas when it is high, degradation of the epoxy resin composition may start. Furthermore, when a pressurization pressure is low, it may result in a case in which air bubbles remain inside the obtained laminated plate, and electric characteristics may deteriorate; whereas it is high, the resin will flow before being cured, and it may not be possible to obtain a cured product with a desired thickness. Furthermore, when a heating and pressurizing time is short, the curing reaction may not proceed sufficiently; whereas when it is long, the epoxy resin composition in the prepregs may thermally degrade, which is not preferable.

The epoxy resin composition can be cured in the same method as for a known epoxy resin composition to obtain an epoxy resin-cured product. As a method of obtaining a cured product, it is possible to use the same method as for a known epoxy resin composition. It is possible to suitably use a method such as casting, injection, potting, dipping, drip coating, transfer molding, compression molding, and a method of obtaining a laminated plate by forming the epoxy resin composition into the form of a resin sheet, copper foil having resin, a prepreg, and the like, laminating them, and curing the laminate under heat and pressure. A curing temperature in this case is generally 100° C. to 300° C., and a curing time is generally about 1 hour to 5 hours.

The epoxy resin-cured product of the present invention can have the form of a laminate, a molded product, an adhered product, a coating film, a film, and the like.

As a result of producing the epoxy resin composition and evaluating the laminated plate and the cured product which are obtained by curing under heating, it is possible to provide an epoxy curable resin composition exhibiting excellent low dielectric properties in a cured product thereof, and imparting excellent copper foil peel strength and interlayer cohesive strength when used in printed circuit plate applications.

EXAMPLES

The present invention will be specifically described with reference to examples and comparative examples, but the present invention is not limited thereto. Unless otherwise specified, "parts" represents parts by mass, "%" represents % by mass, and "ppm" represents ppm by mass. Furthermore, regarding measurement methods, measurements were respectively performed by the following methods.

Hydroxyl equivalent: measured in accordance with JIS K 0070 standard, and expressed in units of "g/eq." A hydroxyl equivalent of a phenolic resin means a phenolic hydroxyl equivalent, unless otherwise specified.

Softening point: measured by a ring-and-ball method in accordance with JIS K 7234 standard. Specifically, an automatic softening point machine (manufactured by MEITEC CORPORATION, ASP-MG4) was used.

Epoxy equivalent: measured in accordance with JIS K 7236 standard, and expressed in units of "g/eq." Specifically, chloroform was used as a solvent, a solution of acetate tetraethyl ammonium bromide was added thereinto, and the mixed solution was titrated with a solution of 0.1 mol/L perchloric acid-acetic acid using an automatic potentiometric titrator (manufactured by HIRANUMA SANGYO Co., Ltd., COM-1600ST).

Total content of chlorine: measured in accordance with JIS K 7243-3 standard, and expressed in units of "ppm". Specifically, diethylene glycol monobutyl ether was used as a solvent, a 1,2-propanediol solution of 1 mol/L potassium hydroxide was added thereinto and heat-treated, and thereafter, the treated solution was titrated with a solution of 0.01 mol/L silver nitrate using an automatic potentiometric titrator (manufactured by HIRANUMA SANGYO Co., Ltd., COM-1700).

Copper foil peel strength and interlayer adhesion force: measured in accordance with JIS C 6481, and interlayer adhesion force was measured by peeling between the 7th layer and the 8th layer.

Relative dielectric and dielectric loss tangent: evaluated by obtaining a relative dielectric and a dielectric loss tangent at a frequency of 1 GHz using a material analyzer (manufactured by AGILENT Technologies) by a capacitance method in accordance with IPC-TM-650, 2.5.5.9.

Gel permeation chromatography (GPC) measurement: a main body (manufactured by TOSOH CORPORATION, HLC-8220GPC), in which columns (manufactured by TOSOH CORPORATION, TSKgel G4000H$_{XL}$, TSKgel G3000H$_{XL}$, and TSKgel G2000H$_{XL}$) were provided in series, was used, and a column temperature was 40° C. Furthermore, tetrahydrofuran (THF) was used as an eluent, a flow rate was set to 1 mL/min, and a differential refractive index detector was used as a detector. As a measurement sample, 50 μL of a sample, which was obtained by dissolving 0.1 g of a sample in 10 mL of THF and filtering the solution through a microfilter, was used. For data processing, GPC-8020 Model II, version 6.00, manufactured by TOSOH CORPORATION was used.

IR: KRS-5 was used as a cell, the sample dissolved in THF was applied onto the cell and dried, and thereafter, an absorbance at a wavenumber of 650 to 4,000 cm$^{-1}$ was measured using a Fourier-transform infrared spectrophotometer (manufactured by PerkinEler Precisely, Spectrum One FT-IR Spectrometer 1760X).

ESI-MS: mass spectrometry, in which acetonitrile and water were used as mobile phases, and a sample dissolved in acetonitrile was measured, was performed using a mass spectrometer (LCMS-2020 manufactured by Shimadzu Corporation)

The abbreviations used in examples and comparative examples are as follows.

[Epoxy Resin]
E1: an epoxy resin obtained in Example 11
E2: an epoxy resin obtained in Example 12
E3: an epoxy resin obtained in Example 13
E4: an epoxy resin obtained in Example 14
E5: an epoxy resin obtained in Example 15
E6: an epoxy resin obtained in Example 16
E7: an epoxy resin obtained in Example 17
E8: an epoxy resin obtained in Example 18

E9: an epoxy resin obtained in Example 19
E10: an epoxy resin obtained in Example 20
E11: an epoxy resin obtained in Comparative Example 3
E12: a phenol-dicyclopentadiene type epoxy resin (manufactured by DIC Corporation, HP-7200H, epoxy equivalent 280, softening point 83° C.)
E13: an aromatically modified novolac epoxy resin (manufactured by NIPPON STEEL Chemical & Material Co., Ltd., YDAN-1000-9HH, epoxy equivalent 293, softening point 97° C.)

[Curing Agent]
A1: a phenolic resin obtained in Example 1
A2: a phenolic resin obtained in Example 2
A3: a phenolic resin obtained in Example 3
A4: a phenolic resin obtained in Example 4
A5: a phenolic resin obtained in Example 5
A6: a phenolic resin obtained in Example 6
A7: a phenolic resin obtained in Example 7
A8: a phenolic resin obtained in Example 8
A9: a phenolic resin obtained in Example 9
A10: a phenolic resin obtained in Example 10
A11: a phenolic resin obtained in Comparative Example 1
A12: a phenol novolac resin (manufactured by Aica Kogyo Company, Limited, Shonol BRG-557, hydroxyl equivalent 105, softening point 80° C.)
A13: a dicyclopentadiene type phenolic resin (manufactured by Gun Ei Chemical Industry Co., Ltd., GDP-6140, hydroxyl equivalent 196, softening point 130° C.)
A14: an aromatically modified phenolic resin obtained in Comparative Example 2

[Curing Accelerator]
C1: 2-ethyl-4-methylimidazole (2E4MZ) (manufactured by SHIKOKU CHEMICALS CORPORATION, CUREZOL 2E4MZ)

Example 1

970 parts of 2,6-xylenol and 14.5 parts of a 47% $BF_3$ ether complex were put into a reaction device including a glass separable flask and equipped with a stirrer, a thermometer, a nitrogen blowing tube, a dropping funnel, and a cooling tube, and the mixture was heated to 70° C. under stirring. While maintaining the same temperature, 300 parts of dicyclopentadiene (0.29 times by mol with respect to 2,6-xylenol) was added dropwise over 2 hours. The reaction was further allowed at a temperature of 125° C. to 135° C. for 6 hours, and 2.3 parts of calcium hydroxide was added. 4.6 parts of an aqueous solution of 10% oxalic acid was further added. Thereafter, the reaction solution was heated to 160° C. for dehydration, and then was heated to 200° C. under a reduced pressure of 5 mmHg to remove an unreacted raw material by evaporation. 1,000 parts of MIBK was added to dissolve the product, 400 parts of warm water at 80° C. was added to wash the solution with water, and a water tank in the bottom layer was separated and removed. Thereafter, heating to 160° C. was performed under a reduced pressure of 5 mmHg to remove MIBK by evaporation. Thereby, 540 parts of a reddish brown phenolic resin (A1) was obtained. A hydroxyl equivalent was 213, a softening point was 71° C., and an absorption ratio ($A_{3040}/A_{1210}$) was 0.11. When a mass spectrum was measured by ESI-MS (negative), it was confirmed that M-=253, 375, 507, 629. FIG. 1 shows GPC of the obtained phenolic resin (A1), and FIG. 2 shows FT-IR. In FIG. 1, "a" indicates a mixture of a product of Formula (1) in which n=1, and a product of Formula (1) in which n=1 with no $R^2$ adduct; and "b" indicates a product of Formula (1) in which n=0. In FIG. 2, "c" indicates a peak derived from C—H stretching vibrations of an olefin moiety of a dicyclopentadiene skeleton, and "d" indicates absorption by C—O stretching vibrations in a phenol nucleus.

Example 2

832 parts of 2,6-xylenol and 12.4 parts of a 47% $BF_3$ ether complex were put into the same reaction device as in Example 1, and the mixture was heated to 70° C. under stirring. While maintaining the same temperature, 300 parts of dicyclopentadiene (0.33 times by mol with respect to 2,6-xylenol) was added dropwise over 2 hours. The reaction was further allowed at a temperature of 125° C. to 135° C. for 6 hours, and 2.0 parts of calcium hydroxide was added. 4.0 parts of an aqueous solution of 10% oxalic acid was further added. Thereafter, the reaction solution was heated to 160° C. for dehydration, and then was heated to 200° C. under a reduced pressure of 5 mmHg to remove an unreacted raw material by evaporation. 1,000 parts of MIBK was added to dissolve the product, 400 parts of warm water at 80° C. was added to wash the solution with water, and a water tank in the bottom layer was separated and removed. Thereafter, heating to 160° C. was performed under a reduced pressure of 5 mmHg to remove MIBK by evaporation. Thereby, 540 parts of a reddish brown phenolic resin (A2) was obtained. A hydroxyl equivalent was 217, a softening point was 64° C., and an absorption ratio ($A_{3040}/A_{1210}$) was 0.17. When a mass spectrum was measured by ESI-MS (negative), it was confirmed that M-=253, 375, 507, 629.

Example 3

693 parts of 2,6-xylenol and 10.4 parts of a 47% $BF_3$ ether complex were put into the same reaction device as in Example 1, and the mixture was heated to 70° C. under stirring. While maintaining the same temperature, 300 parts of dicyclopentadiene (0.40 times by mol with respect to 2,6-xylenol) was added dropwise over 2 hours. The reaction was further allowed at a temperature of 125° C. to 135° C. for 6 hours, and 1.7 parts of calcium hydroxide was added. 3.3 parts of an aqueous solution of 10% oxalic acid was further added. Thereafter, the reaction solution was heated to 160° C. for dehydration, and then was heated to 200° C. under a reduced pressure of 5 mmHg to remove an unreacted raw material by evaporation. 1,800 parts of MIBK was added to dissolve the product, 650 parts of warm water at 80° C. was added to wash the solution with water, and a water tank in the bottom layer was separated and removed. Thereafter, heating to 160° C. was performed under a reduced pressure of 5 mmHg to remove MIBK by evaporation. Thereby, 1,040 parts of a reddish brown phenolic resin (A3) was obtained. A hydroxyl equivalent was 222, a softening point was 55° C., and an absorption ratio ($A_{3040}/A_{1210}$) was 0.20. When a mass spectrum was measured by ESI-MS (negative), it was confirmed that M-=253, 375, 507, 629.

Example 4

832 parts of 2,6-xylenol and 12.5 parts of a 47% $BF_3$ ether complex were put into the same reaction device as in Example 1, and the mixture was heated to 70° C. under stirring. While maintaining the same temperature, 450 parts of dicyclopentadiene (0.50 times by mol with respect to 2,6-xylenol) was added dropwise over 2 hours. The reaction was further allowed at a temperature of 125° C. to 135° C. for 6 hours, and 2.0 parts of calcium hydroxide was added. 4.0 parts of an aqueous solution of 10% oxalic acid was further added. Thereafter, the reaction solution was heated to 160° C. for dehydration, and then was heated to 200° C. under a reduced pressure of 5 mmHg to remove an unreacted raw material by evaporation. 1,800 parts of MIBK was added to dissolve the product, 650 parts of warm water at 80° C. was added to wash the solution with water, and a water tank in the bottom layer was separated and removed. Thereafter, heating to 160° C. was performed under a reduced pressure of 5 mmHg to remove MIBK by evaporation. Thereby, 1,040 parts of a reddish brown phenolic resin (A4) was obtained. A hydroxyl equivalent was 226, the resin was semi-solid at room temperature, and an absorption ratio ($A_{3040}/A_{1210}$) was 0.32. When a mass spectrum was measured by ESI-MS (negative), it was confirmed that M-=253, 375, 507, 629.

Example 5

140 parts of 2,6-xylenol and 9.3 parts of a 47% $BF_3$ ether complex were put into the same reaction device as in Example 1, and the mixture was heated to 110° C. under stirring. While maintaining the same temperature, 86.6 parts of dicyclopentadiene (0.56 times by mol with respect to 2,6-xylenol) was added dropwise over 1 hour. The reaction was further allowed at a temperature of 110° C. for 3 hours, and then while maintaining the same temperature, 68 parts of dicyclopentadiene (0.44 times by mol with respect to 2,6-xylenol) was added dropwise over 1 hour. The reaction was further allowed at 120° C. for 2 hours. 1.5 parts of calcium hydroxide was added. 3 parts of an aqueous solution of 10% oxalic acid was further added. Thereafter, the reaction solution was heated to 160° C. for dehydration, and then was heated to 200° C. under a reduced pressure of 5 mmHg to remove an unreacted raw material by evaporation. 700 parts of MIBK was added to dissolve the product, 200 parts of warm water at 80° C. was added to wash the solution with water, and a water tank in the bottom layer was separated and removed. Thereafter, heating to 160° C. was performed under a reduced pressure of 5 mmHg to remove MIBK by evaporation. Thereby, 274 parts of a reddish brown phenolic resin (A5) was obtained. A hydroxyl equivalent was 277, a softening point of the resin was 97° C., and an absorption ratio ($A_{3040}/A_{1210}$) was 0.14. When a mass spectrum was measured by ESI-MS (negative), it was confirmed that M-=253, 375, 507, 629.

Example 6

150 parts of 2,6-xylenol and 8.7 parts of a 47% $BF_3$ ether complex were put into the same reaction device as in Example 1, and the mixture was heated to 110° C. under stirring. While maintaining the same temperature, 81.2 parts of dicyclopentadiene (0.50 times by mol with respect to 2,6-xylenol) was added dropwise over 1 hour. The reaction was further allowed at a temperature of 110° C. for 3 hours, and then while maintaining the same temperature, 69.4 parts of dicyclopentadiene (0.43 times by mol with respect to 2,6-xylenol) was added dropwise over 1 hour. The reaction was further allowed at 120° C. for 2 hours. 1.4 parts of calcium hydroxide was added. 2.8 parts of an aqueous solution of 10% oxalic acid was further added. Thereafter, the reaction solution was heated to 160° C. for dehydration, and then was heated to 200° C. under a reduced pressure of 5 mmHg to remove an unreacted raw material by evaporation. 700 parts of MIBK was added to dissolve the product, 200 parts of warm water at 80° C. was added to wash the solution with water, and a water tank in the bottom layer was separated and removed. Thereafter, heating to 160° C. was performed under a reduced pressure of 5 mmHg to remove MIBK by evaporation. Thereby, 281 parts of a reddish brown phenolic resin (A6) was obtained. A hydroxyl equivalent was 261, a softening point of the resin was 95° C., and an absorption ratio ($A_{3040}/A_{1210}$) was 0.13. When a mass spectrum was measured by ESI-MS (negative), it was confirmed that M-=253, 375, 507, 629.

Example 7

95.0 parts of 2,6-xylenol and 6.3 parts of a 47% $BF_3$ ether complex were put into the same reaction device as in Example 1, and the mixture was heated to 70° C. under stirring. While maintaining the same temperature, 58.8 parts of dicyclopentadiene (0.56 times by mol with respect to 2,6-xylenol) was added dropwise over 1 hour. The reaction was further allowed at a temperature of 115° C. to 125° C. for 3 hours. Thereafter, at the same temperature, 69.2 parts of dicyclopentadiene (0.67 times by mol with respect to 2,6-xylenol) was added dropwise over 1 hour, and the reaction was allowed at a temperature of 115° C. to 125° C. for 2 hours. 1.0 part of calcium hydroxide was added. 2.0 parts of an aqueous solution of 10% oxalic acid was further added. Thereafter, the reaction solution was heated to 160° C. for dehydration, and then was heated to 200° C. under a reduced pressure of 5 mmHg to remove an unreacted raw material by evaporation. 520 parts of MIBK was added to dissolve the product, 150 parts of warm water at 80° C. was added to wash the solution with water, and a water tank in the bottom layer was separated and removed. Thereafter, heating to 160° C. was performed under a reduced pressure of 5 mmHg to remove MIBK by evaporation. Thereby, 221 parts of a reddish brown phenolic resin (A7) was obtained. A hydroxyl equivalent was 377, a softening point was 102° C., and an absorption ratio ($A_{3040}/A_{1210}$) was 0.18. When a mass spectrum was measured by ESI-MS (negative), it was confirmed that M-=253, 375, 507, 629. FIG. 3 shows GPC of the obtained phenolic resin (A7), and FIG. 4 shows FT-IR.

Example 8

90.0 parts of 2,6-xylenol and 7.0 parts of a 47% $BF_3$ ether complex were put into the same reaction device as in Example 1, and the mixture was heated to 70° C. under stirring. While maintaining the same temperature, 64.9 parts of dicyclopentadiene (0.66 times by mol with respect to 2,6-xylenol) was added dropwise over 1 hour. The reaction was further allowed at a temperature of 115° C. to 125° C. for 3 hours. Thereafter, at the same temperature, 69.7 parts of dicyclopentadiene (0.72 times by mol with respect to 2,6-xylenol) was added dropwise over 1 hour, and the reaction was allowed at a temperature of 115° C. to 125° C. for 2 hours. 1.1 parts of calcium hydroxide was added. 2.3 parts of an aqueous solution of 10% oxalic acid was further added. Thereafter, the reaction solution was heated to 160° C. for dehydration, and then was heated to 200° C. under a reduced pressure of 5 mmHg to remove an unreacted raw material by evaporation. 525 parts of MIBK was added to dissolve the product, 150 parts of warm water at 80° C. was added to wash the solution with water, and a water tank in the bottom layer was separated and removed. Thereafter, heating to 160° C. was performed under a reduced pressure of 5 mmHg to remove MIBK by evaporation. Thereby, 222 parts of a reddish brown phenolic resin (A8) was obtained. A hydroxyl equivalent was 342, a softening point was 104° C., and an absorption ratio ($A_{3040}/A_{1210}$) was 0.18. When a mass spectrum was measured by ESI-MS (negative), it was confirmed that M-=253, 375, 507, 629.

Example 9

80.0 parts of 2,6-xylenol and 7.4 parts of a 47% $BF_3$ ether complex were put into the same reaction device as in Example 1, and the mixture was heated to 70° C. under stirring. While maintaining the same temperature, 69.3 parts of dicyclopentadiene (0.80 times by mol with respect to 2,6-xylenol) was added dropwise over 1 hour. The reaction was further allowed at a temperature of 115° C. to 125° C. for 3 hours. Thereafter, at the same temperature, 67.2 parts of dicyclopentadiene (0.78 times by mol with respect to 2,6-xylenol) was added dropwise over 1 hour, and the reaction was allowed at a temperature of 115° C. to 125° C. for 2 hours. 1.2 parts of calcium hydroxide was added. 2.4 parts of an aqueous solution of 10% oxalic acid was further added. Thereafter, the reaction solution was heated to 160° C. for dehydration, and then was heated to 200° C. under a reduced pressure of 5 mmHg to remove an unreacted raw material by evaporation. 505 parts of MIBK was added to dissolve the product, 150 parts of warm water at 80° C. was added to wash the solution with water, and a water tank in the bottom layer was separated and removed. Thereafter, heating to 160° C. was performed under a reduced pressure of 5 mmHg to remove MIBK by evaporation. Thereby, 214 parts of a reddish brown phenolic resin (A9) was obtained. A hydroxyl equivalent was 370, a softening point was 108° C., and an absorption ratio ($A_{3040}/A_{1210}$) was 0.19. When a mass spectrum was measured by ESI-MS (negative), it was confirmed that M-=253, 375, 507, 629.

Example 10

90.0 parts of 2,6-xylenol and 6.0 parts of a 47% $BF_3$ ether complex were put into the same reaction device as in Example 1, and the mixture was heated to 70° C. under stirring. While maintaining the same temperature, 55.7 parts of dicyclopentadiene (0.57 times by mol with respect to 2,6-xylenol) was added dropwise over 1 hour. The reaction was further allowed at a temperature of 115° C. to 125° C. for 3 hours. Thereafter, at the same temperature, 87.4 parts of dicyclopentadiene (0.89 times by mol with respect to 2,6-xylenol) was added dropwise over 1 hour, and the reaction was allowed at a temperature of 115° C. to 125° C. for 2 hours. 1.0 part of calcium hydroxide was added. 1.9 parts of an aqueous solution of 10% oxalic acid was further added. Thereafter, the reaction solution was heated to 160° C. for dehydration, and then was heated to 200° C. under a reduced pressure of 5 mmHg to remove an unreacted raw material by evaporation. 550 parts of MIBK was added to dissolve the product, 155 parts of warm water at 80° C. was added to wash the solution with water, and a water tank in the bottom layer was separated and removed. Thereafter, heating to 160° C. was performed under a reduced pressure of 5 mmHg to remove MIBK by evaporation. Thereby, 222 parts of a reddish brown phenolic resin (A10) was obtained. A hydroxyl equivalent was 384, a softening point was 111° C., and an absorption ratio ($A_{3040}/A_{1210}$) was 0.19. When a mass spectrum was measured by ESI-MS (negative), it was confirmed that M-=253, 375, 507, 629.

Comparative Example 1

1,109 parts of 2,6-xylenol and 16.6 parts of a 47% $BF_3$ ether complex were put into the same reaction device as in Example 1, and the mixture was heated to 70° C. under stirring. While maintaining the same temperature, 300 parts of dicyclopentadiene (0.25 times by mol with respect to 2,6-xylenol) was added dropwise over 2 hours. The reaction was further allowed at a temperature of 125° C. to 135° C. for 6 hours, and 2.6 parts of calcium hydroxide was added. 5.2 parts of an aqueous solution of 10% oxalic acid was further added. Thereafter, the reaction solution was heated to 160° C. for dehydration, and then was heated to 200° C. under a reduced pressure of 5 mmHg to remove an unreacted raw material by evaporation. 1,000 parts of MIBK was added to dissolve the product, 400 parts of warm water at 80° C. was added to wash the solution with water, and a water tank in the bottom layer was separated and removed. Thereafter, heating to 160° C. was performed under a reduced pressure of 5 mmHg to remove MIBK by evaporation. Thereby, 540 parts of a reddish brown diphenolic resin (A5) was obtained. A hydroxyl equivalent was 208, a softening point was 89.5° C., and a peak could not be confirmed at 3040 $cm^{-1}$ in the FT-IR measurement. When a mass spectrum was measured by ESI-MS (negative), it was confirmed that M-=375, 629. A reaction rate of dicyclopentadiene was 100%. FIG. 5 shows GPC of the obtained phenolic resin ($A_{11}$), and FIG. 6 shows FT-IR.

Comparative Example 2

105 parts of a phenol novolac resin (phenolic hydroxyl equivalent 105, softening point 130° C.) and 0.1 parts of p-toluenesulfonic acid were put into a separable flask similar to that of Example 1, and a temperature was raised to 150° C. While maintaining the same temperature, 94 parts of styrene was added dropwise over 3 hours, and stirring was continued at the same temperature for 1 hour. Thereafter, the reaction solution was dissolved in 500 parts of MIBK and washed with water at 80° C. 5 times. Subsequently, MIBK was distilled off under reduced pressure, and thereby an aromatically modified phenol novolac resin (A14) was obtained. A hydroxyl equivalent was 199, and a softening point was 110° C.

Example 11

250 parts of the phenolic resin (A1) obtained in Example 1, 544 parts of epichlorohydrin, and 163 parts of diethylene glycol dimethyl ether were put into a reaction device equipped with a stirrer, a thermometer, a nitrogen blowing ring, a dropping funnel, and a cooling tube, and the mixture was heated to 65° C. 108 parts of an aqueous solution of 49% sodium hydroxide was added dropwise over 4 hours under a reduced pressure of 125 mmHg while maintaining a temperature of 63° C. to 67° C. During this time, epichlorohydrin was azeotroped with water, and outflowing water was sequentially removed from the system. After completion of the reaction, epichlorohydrin was recovered under the conditions of 5 mmHg and 180° C., and 948 parts of MIBK was added to dissolve the product. Thereafter, 263 parts of water was added to dissolve by-product salts, the solution was left to stand, and the saline solution in the bottom layer was separated and removed. Neutralization was performed with an aqueous solution of phosphoric acid. Thereafter, the resin solution was washed with water until the washing liquid became neutral, and then was filtered.

MIBK was distilled off by heating to 180° C. under a reduced pressure of 5 mmHg, and thereby 298 parts of a reddish brown transparent 2,6-xylenol-dicyclopentadiene type epoxy resin (E1) was obtained. An epoxy equivalent was 282, a total content of chlorine was 980 ppm, and the resin was semi-solid at room temperature. FIG. 7 shows GPC of the obtained epoxy resin (E1).

Example 12

250 parts of the phenolic resin (A2) obtained in Example 2, 533 parts of epichlorohydrin, and 160 parts of diethylene glycol dimethyl ether were put into the same reaction device as in Example 11, and the mixture was heated to 65° C. 106 parts of an aqueous solution of 49% sodium hydroxide was added dropwise over 4 hours under a reduced pressure of 125 mmHg while maintaining a temperature of 63° C. to 67° C. During this time, epichlorohydrin was azeotroped with water, and outflowing water was sequentially removed from the system. After completion of the reaction, epichlorohydrin was recovered under the conditions of 5 mmHg and 180° C., and 944 parts of MIBK was added to dissolve the product. Thereafter, 257 parts of water was added to dissolve by-product salts, the solution was left to stand, and the saline solution in the bottom layer was separated and removed. Neutralization was performed with an aqueous solution of phosphoric acid. Thereafter, the resin solution was washed with water until the washing liquid became neutral, and then was filtered. MIBK was distilled off by heating to 180° C. under a reduced pressure of 5 mmHg, and thereby 223 parts of a reddish brown transparent 2,6-xylenol-dicyclopentadiene type epoxy resin (E2) was obtained. An epoxy equivalent was 289, a total content of chlorine was 945 ppm, and the resin was semi-solid at room temperature.

Example 13

250 parts of the phenolic resin (A3) obtained in Example 3, 522 parts of epichlorohydrin, and 157 parts of diethylene glycol dimethyl ether were put into the same reaction device as in Example 11, and the mixture was heated to 65° C. 104 parts of an aqueous solution of 49% sodium hydroxide was added dropwise over 4 hours under a reduced pressure of 125 mmHg while maintaining a temperature of 63° C. to 67° C. During this time, epichlorohydrin was azeotroped with water, and outflowing water was sequentially removed from the system. After completion of the reaction, epichlorohydrin was recovered under the conditions of 5 mmHg and 180° C., and 940 parts of MIBK was added to dissolve the product. Thereafter, 252 parts of water was added to dissolve by-product salts, the solution was left to stand, and the saline solution in the bottom layer was separated and removed. Neutralization was performed with an aqueous solution of phosphoric acid. Thereafter, the resin solution was washed with water until the washing liquid became neutral, and then was filtered. MIBK was distilled off by heating to 180° C. under a reduced pressure of 5 mmHg, and thereby 263 parts of a reddish brown transparent 2,6-xylenol-dicyclopentadiene type epoxy resin (E3) was obtained. An epoxy equivalent was 296, a total content of chlorine was 897 ppm, and the resin was semi-solid at room temperature.

Example 14

250 parts of the phenolic resin (A4) obtained in Example 4, 512 parts of epichlorohydrin, and 154 parts of diethylene glycol dimethyl ether were put into the same reaction device as in Example 11, and the mixture was heated to 65° C. 102 parts of an aqueous solution of 49% sodium hydroxide was added dropwise over 4 hours under a reduced pressure of 125 mmHg while maintaining a temperature of 63° C. to 67° C. During this time, epichlorohydrin was azeotroped with water, and outflowing water was sequentially removed from the system. After completion of the reaction, epichlorohydrin was recovered under the conditions of 5 mmHg and 180° C., and 936 parts of MIBK was added to dissolve the product. Thereafter, 247 parts of water was added to dissolve by-product salts, the solution was left to stand, and the saline solution in the bottom layer was separated and removed. Neutralization was performed with an aqueous solution of phosphoric acid. Thereafter, the resin solution was washed with water until the washing liquid became neutral, and then was filtered. MIBK was distilled off by heating to 180° C. under a reduced pressure of 5 mmHg, and thereby 287 parts of a reddish brown transparent 2,6-xylenol-dicyclopentadiene type epoxy resin (E4) was obtained. An epoxy equivalent was 303, a total content of chlorine was 894 ppm, and the resin was semi-solid at room temperature.

Example 15

180 parts of the phenolic resin (A5) obtained in Example 5, 301 parts of epichlorohydrin, and 90 parts of diethylene glycol dimethyl ether were put into the same reaction device as in Example 11, and the mixture was heated to 65° C. 58 parts of an aqueous solution of 49% sodium hydroxide was added dropwise over 4 hours under a reduced pressure of 125 mmHg while maintaining a temperature of 63° C. to 67° C. During this time, epichlorohydrin was azeotroped with water, and outflowing water was sequentially removed from the system. After completion of the reaction, epichlorohydrin was recovered under the conditions of 5 mmHg and 180° C., and 505 parts of MIBK was added to dissolve the product. Thereafter, 153 parts of water was added to dissolve by-product salts, the solution was left to stand, and the saline solution in the bottom layer was separated and removed. Neutralization was performed with an aqueous solution of phosphoric acid. Thereafter, the resin solution was washed with water until the washing liquid became neutral, and then was filtered. MIBK was distilled off by heating to 180° C. under a reduced pressure of 5 mmHg, and thereby 189 parts of a reddish brown transparent 2,6-xylenol-dicyclopentadiene type epoxy resin (E5) was obtained. An epoxy equivalent was 348, a total content of chlorine was 570 ppm, and a softening point of the resin was 82° C.

Example 16

180 parts of the phenolic resin (A6) obtained in Example 6, 159 parts of epichlorohydrin, and 48 parts of diethylene glycol dimethyl ether were put into the same reaction device as in Example 11, and the mixture was heated to 65° C. 62 parts of an aqueous solution of 49% sodium hydroxide was added dropwise over 4 hours under a reduced pressure of 125 mmHg while maintaining a temperature of 63° C. to 67° C. During this time, epichlorohydrin was azeotroped with water, and outflowing water was sequentially removed from the system. After completion of the reaction, epichlorohydrin was recovered under the conditions of 5 mmHg and 180° C., and 510 parts of MIBK was added to dissolve the product. Thereafter, 155 parts of water was added to dissolve by-product salts, the solution was left to stand, and the saline solution in the bottom layer was separated and removed. Neutralization was performed with an aqueous solution of phosphoric acid. Thereafter, the resin solution was washed with water until the washing liquid became neutral, and then was filtered. MIBK was distilled off by heating to 180° C. under a reduced pressure of 5 mmHg, and thereby 179 parts of a reddish brown transparent 2,6-xylenol-dicyclopentadiene type epoxy resin (E6) was obtained. An epoxy equivalent was 372, a total content of chlorine was 535 ppm, and a softening point of the resin was 85° C.

Example 17

180 parts of the phenolic resin (A7) obtained in Example 7, 221 parts of epichlorohydrin, and 33 parts of diethylene glycol dimethyl ether were put into the same reaction device as in Example 11, and the mixture was heated to 65° C. 39 parts of an aqueous solution of 49% sodium hydroxide was added dropwise over 4 hours under a reduced pressure of 125 mmHg while maintaining a temperature of 63° C. to 67° C. During this time, epichlorohydrin was azeotroped with water, and outflowing water was sequentially removed from the system. After completion of the reaction, epichlorohydrin was recovered under the conditions of 5 mmHg and 180° C., and 482 parts of MIBK was added to dissolve the product. Thereafter, 146 parts of water was added to dissolve by-product salts, the solution was left to stand, and the saline solution in the bottom layer was separated and removed. Neutralization was performed with an aqueous solution of phosphoric acid. Thereafter, the resin solution was washed with water until the washing liquid became neutral, and then was filtered. MIBK was distilled off by heating to 180° C. under a reduced pressure of 5 mmHg, and thereby 200 parts of a reddish brown transparent 2,6-xylenol-dicyclopentadiene type epoxy resin (E7) was obtained. An epoxy equivalent was 446, a total content of chlorine was 431 ppm, and a softening point of the resin was 91° C. FIG. 8 shows GPC of the obtained epoxy resin (E7).

Example 18

180 parts of the phenolic resin (A8) obtained in Example 8, 243 parts of epichlorohydrin, and 37 parts of diethylene glycol dimethyl ether were put into the same reaction device as in Example 11, and the mixture was heated to 65° C. 43 parts of an aqueous solution of 49% sodium hydroxide was added dropwise over 4 hours under a reduced pressure of 125 mmHg while maintaining a temperature of 63° C. to 67° C. During this time, epichlorohydrin was azeotroped with water, and outflowing water was sequentially removed from the system. After completion of the reaction, epichlorohydrin was recovered under the conditions of 5 mmHg and 180° C., and 489 parts of MIBK was added to dissolve the product. Thereafter, 148 parts of water was added to dissolve by-product salts, the solution was left to stand, and the saline solution in the bottom layer was separated and removed. Neutralization was performed with an aqueous solution of phosphoric acid. Thereafter, the resin solution was washed with water until the washing liquid became neutral, and then was filtered. MIBK was distilled off by heating to 180° C. under a reduced pressure of 5 mmHg, and thereby 203 parts of a reddish brown transparent 2,6-xylenol-dicyclopentadiene type epoxy resin (E8) was obtained. An epoxy equivalent was 433, a total content of chlorine was 447 ppm, and a softening point of the resin was 93° C.

Example 19

180 parts of the phenolic resin (A9) obtained in Example 9, 225 parts of epichlorohydrin, and 34 parts of diethylene glycol dimethyl ether were put into the same reaction device as in Example 11, and the mixture was heated to 65° C. 40 parts of an aqueous solution of 49% sodium hydroxide was added dropwise over 4 hours under a reduced pressure of 125 mmHg while maintaining a temperature of 63° C. to 67° C. During this time, epichlorohydrin was azeotroped with water, and outflowing water was sequentially removed from the system. After completion of the reaction, epichlorohydrin was recovered under the conditions of 5 mmHg and 180° C., and 483 parts of MIBK was added to dissolve the product. Thereafter, 147 parts of water was added to dissolve by-product salts, the solution was left to stand, and the saline solution in the bottom layer was separated and removed. Neutralization was performed with an aqueous solution of phosphoric acid. Thereafter, the resin solution was washed with water until the washing liquid became neutral, and then was filtered. MIBK was distilled off by heating to 180° C. under a reduced pressure of 5 mmHg, and thereby 137 parts of a reddish brown transparent 2,6-xylenol-dicyclopentadiene type epoxy resin (E9) was obtained. An epoxy equivalent was 468, a total content of chlorine was 382 ppm, and a softening point of the resin was 97° C.

Example 20

180 parts of the phenolic resin (A10) obtained in Example 10, 217 parts of epichlorohydrin, and 33 parts of diethylene glycol dimethyl ether were put into the same reaction device as in Example 11, and the mixture was heated to 65° C. 38 parts of an aqueous solution of 49% sodium hydroxide was added dropwise over 4 hours under a reduced pressure of 125 mmHg while maintaining a temperature of 63° C. to 67° C. During this time, epichlorohydrin was azeotroped with water, and outflowing water was sequentially removed from the system. After completion of the reaction, epichlorohydrin was recovered under the conditions of 5 mmHg and 180° C., and 481 parts of MIBK was added to dissolve the product. Thereafter, 146 parts of water was added to dissolve by-product salts, the solution was left to stand, and the saline solution in the bottom layer was separated and removed. Neutralization was performed with an aqueous solution of phosphoric acid. Thereafter, the resin solution was washed with water until the washing liquid became neutral, and then was filtered. MIBK was distilled off by heating to 180° C. under a reduced pressure of 5 mmHg, and thereby 126 parts of a reddish brown transparent 2,6-xylenol-dicyclopentadiene type epoxy resin (E10) was obtained. An epoxy equivalent was 475, a total content of chlorine was 394 ppm, and a softening point of the resin was 101° C.

Comparative Example 3

281 parts of the phenolic resin (A11) obtained in Comparative Example 1, 625 parts of epichlorohydrin, and 187 parts of diethylene glycol dimethyl ether were put into the same reaction device as in Example 11, and the mixture was heated to 65° C. 124 parts of an aqueous solution of 49% sodium hydroxide was added dropwise over 4 hours under a reduced pressure of 125 mmHg while maintaining a temperature of 63° C. to 67° C. During this time, epichlorohydrin was azeotroped with water, and outflowing water was sequentially removed from the system. After completion of the reaction, epichlorohydrin was recovered under the conditions of 5 mmHg and 180° C., and 1,070 parts of MIBK was added to dissolve the product. Thereafter, 301 parts of water was added to dissolve by-product salts, the solution was left to stand, and the saline solution in the bottom layer was separated and removed. Neutralization was performed with an aqueous solution of phosphoric acid. Thereafter, the resin solution was washed with water until the washing liquid became neutral, and then was filtered. MIBK was distilled off by heating to 180° C. under a reduced pressure of 5 mmHg, and thereby 338 parts of a reddish brown transparent 2,6-xylenol-dicyclopentadiene type epoxy resin (E11) was obtained. An epoxy equivalent was 275, a total content of chlorine was 950 ppm, and a softening point was 51° C. FIG. 9 shows GPC of the obtained epoxy resin (E11).

Example 21

100 parts of the epoxy resin (E1) as an epoxy resin, 37 parts of the phenolic resin (A12) as a curing agent, and 0.22 parts of C1 as a curing accelerator were blended in and dissolved in a mixed solvent prepared with MEK, propylene glycol monomethyl ether, and N,N-dimethylformamide. Thereby, epoxy resin composition varnish was obtained. A glass cloth (manufactured by Nitto Boseki Co., Ltd., WEA 7628 XS13, 0.18-mm thick) was impregnated with the obtained epoxy resin composition varnish. The impregnated glass cloth was dried in a hot air circulating oven at 150° C. for 9 minutes to obtain prepregs. Pieces of copper foil (MITSUI MINING & SMELTING CO., LTD., 3EC-III, thickness 35 μm) were superimposed on the top and bottom of eight sheets of the obtained prepregs, and vacuum pressing was performed at 2 MPa under the temperature conditions of 130° C.×15 minutes+190° C.×80 minutes. Thereby, a laminated plate having a thickness of 1.6 mm was obtained. Table 1 shows the results of copper foil peel strength and interlayer adhesion force of the laminated plate.

Furthermore, the obtained prepregs were untwisted and formed into a powdery prepreg powder that would pass through a 100-mesh sieve. The obtained prepreg powder was put into a fluororesin mold, and vacuum pressing was performed at 2 MPa under the temperature conditions of 130° C.×15 minutes+190° C.×80 minutes. Thereby, a test piece with 50 mm square×2 mm thickness was obtained. Table 1 shows the results of a relative dielectric and a dielectric loss tangent of the test piece.

Examples 22 to 45

Components were blended in formulation amounts (parts) shown in Tables 1 to 3, and the same operation as in Example 21 was performed. Thereby, laminated plates and test pieces were obtained. A usage amount of a curing accelerator was set such that a varnish gel time could be adjusted to about 300 seconds. The same test as in Example 21 was performed, and the results are shown in Tables 1 to 3.

Comparative Examples 4 to 11

Components were blended in a formulation amount (parts) shown in Table 4, and the same operation as in Example 21 was performed. Thereby, a laminated plate and a test piece were obtained. A usage amount of a curing accelerator was set such that a varnish gel time could be adjusted to about 300 seconds. The same test as in Example 21 was performed, and the results are shown in Table 4.

TABLE 1

| Examples | 21 | 22 | 23 | 24 | 25 | 26 | 27 | 28 | 29 | 30 |
|---|---|---|---|---|---|---|---|---|---|---|
| E1 | 100 | | | | | | | | | |
| E2 | | 100 | | | | | | | | |
| E3 | | | 100 | | | | | | | |
| E4 | | | | 100 | | | | | | |
| E5 | | | | | 100 | | | | | |
| E6 | | | | | | 100 | | | | |
| E7 | | | | | | | 100 | | | |
| E8 | | | | | | | | 100 | | |
| E9 | | | | | | | | | 100 | |
| E10 | | | | | | | | | | 100 |
| A12 | 37 | 36 | 35 | 35 | 30 | 28 | 24 | 24 | 22 | 22 |
| C1 | 0.22 | 0.24 | 0.26 | 0.27 | 0.20 | 0.18 | 0.20 | 0.22 | 0.18 | 0.15 |
| Copper foil peel strength (kN/m) | 1.7 | 1.6 | 1.5 | 1.2 | 1.2 | 1.2 | 1.1 | 1.1 | 1.0 | 1.0 |
| Interlayer adhesion force (kN/m) | 1.6 | 1.6 | 1.5 | 1.3 | 1.2 | 1.2 | 1.0 | 1.0 | 0.8 | 0.8 |
| Relative dielectric | 2.98 | 2.95 | 2.95 | 2.94 | 2.87 | 2.94 | 2.83 | 2.85 | 2.82 | 2.81 |
| Dielectric loss tangent | 0.014 | 0.014 | 0.014 | 0.012 | 0.014 | 0.015 | 0.010 | 0.011 | 0.011 | 0.011 |

TABLE 2

| Examples | 31 | 32 | 33 | 34 | 35 | 36 | 37 | 38 | 39 | 40 |
|---|---|---|---|---|---|---|---|---|---|---|
| E6 | 100 | 100 | 100 | 100 | 100 | 100 | 100 | 100 | 100 | 100 |
| A1 | 76 | | | | | | | | | |
| A2 | | 78 | | | | | | | | |

TABLE 2-continued

| Examples | 31 | 32 | 33 | 34 | 35 | 36 | 37 | 38 | 39 | 40 |
|---|---|---|---|---|---|---|---|---|---|---|
| A3 |  |  | 79 |  |  |  |  |  |  |  |
| A4 |  |  |  | 81 |  |  |  |  |  |  |
| A5 |  |  |  |  | 99 |  |  |  |  |  |
| A6 |  |  |  |  |  | 93 |  |  |  |  |
| A7 |  |  |  |  |  |  | 135 |  |  |  |
| A8 |  |  |  |  |  |  |  | 122 |  |  |
| A9 |  |  |  |  |  |  |  |  | 132 |  |
| A10 |  |  |  |  |  |  |  |  |  | 137 |
| C1 | 0.31 | 0.34 | 0.35 | 0.36 | 0.27 | 0.29 | 0.43 | 0.46 | 0.40 | 0.32 |
| Copper foil peel strength (kN/m) | 1.8 | 1.7 | 1.6 | 1.1 | 1.5 | 1.6 | 1.0 | 1.1 | 1.0 | 0.9 |
| Interlayer adhesion force (kN/m) | 1.4 | 1.3 | 1.4 | 1.1 | 1.2 | 1.2 | 0.8 | 0.9 | 0.8 | 0.7 |
| Relative dielectric | 3.10 | 3.07 | 3.07 | 3.06 | 2.89 | 2.90 | 2.83 | 2.85 | 2.81 | 2.81 |
| Dielectric loss tangent | 0.013 | 0.013 | 0.013 | 0.011 | 0.012 | 0.012 | 0.011 | 0.012 | 0.010 | 0.010 |

TABLE 3

| Examples | 41 | 42 | 43 | 44 | 45 |
|---|---|---|---|---|---|
| E1 | 100 | 100 |  |  |  |
| E7 |  |  | 100 | 100 | 100 |
| A7 |  |  | 85 |  |  |
| A13 | 70 |  |  | 44 |  |
| A14 |  | 71 |  |  | 45 |
| C1 | 0.34 | 0.56 | 0.50 | 0.32 | 0.52 |
| Copper foil peel strength (kN/m) | 1.7 | 1.5 | 1.0 | 1.1 | 1.0 |
| Interlayer adhesion force (KN/m) | 1.6 | 0.9 | 0.9 | 0.9 | 0.8 |
| Relative dielectric | 2.89 | 2.89 | 2.70 | 2.79 | 2.73 |
| Dielectric loss tangent | 0.013 | 0.011 | 0.008 | 0.010 | 0.012 |

As can be clearly seen from these results, it is possible to provide a resin-cured product exhibiting very favorable low dielectric properties and also imparting excellent adhesion force from the 2,6-disubstituted dicyclopentadiene type epoxy resin, the 2,6-disubstituted dicyclopentadiene type phenolic resin, and the resin compositions containing them, all of which were obtained in the examples.

INDUSTRIAL APPLICABILITY

The epoxy resin composition of the present invention can be used for various applications such as paints, adhesion in civil engineering, casting, electrical and electronic materials, and film materials, and can be suitably used particularly in applications of printed circuit boards, which are one of electrical and electronic materials, particularly in mobile applications, server applications, and the like, in which a low dielectric loss tangent is strongly required.

TABLE 4

| Comparative Example | 4 | 5 | 6 | 7 | 8 | 9 | 10 | 11 |
|---|---|---|---|---|---|---|---|---|
| E11 | 100 | 100 | 100 |  |  |  |  |  |
| E12 |  |  |  | 100 | 100 | 100 | 100 |  |
| E13 |  |  |  |  |  |  |  | 100 |
| A11 |  |  |  | 74 |  |  |  |  |
| A12 | 38 |  |  |  | 38 |  |  | 36 |
| A13 |  | 71 |  |  |  | 70 |  |  |
| A14 |  |  | 72 |  |  |  | 71 |  |
| C1 | 0.20 | 0.32 | 0.52 | 0.28 | 0.10 | 0.15 | 0.20 | 1.00 |
| Copper foil peel strength (kN/m) | 1.8 | 1.8 | 1.6 | 1.8 | 1.6 | 1.6 | 1.4 | 1.2 |
| Interlayer adhesion force (kN/m) | 1.4 | 1.4 | 0.8 | 1.2 | 1.2 | 1.2 | 0.7 | 0.8 |
| Relative dielectric | 3.03 | 2.94 | 2.93 | 3.14 | 3.17 | 3.07 | 3.07 | 3.10 |
| Dielectric loss tangent | 0.015 | 0.014 | 0.012 | 0.015 | 0.021 | 0.020 | 0.015 | 0.015 |

The invention claimed is:

1. A phenolic resin represented by General Formula (1) below:

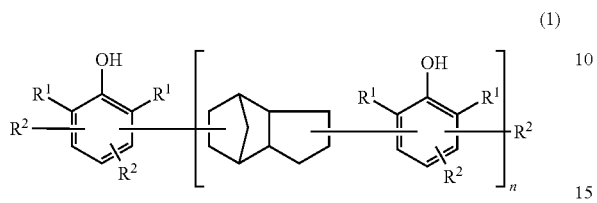

(1)

in the formula, $R^1$'s each independently represent a hydrocarbon group having 1 to 8 carbon atoms; $R^2$'s each independently represent a hydrogen atom, Formula (1a), or Formula (1b) below, where at least one of $R^2$'s is Formula (1a) or Formula (1b); and n represents the number of repetitions, where an average value thereof is a number of 0 to 5,

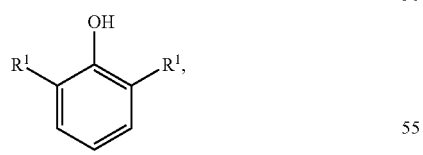

(1a)

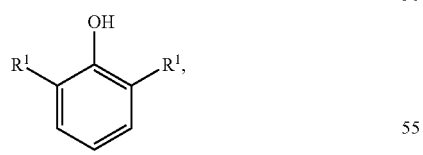

(1b)

wherein the resin is obtained by reacting dicyclopentadiene, in a ratio of 0.28 to 1 times by mol, or in a case where dicyclopentadiene is sequentially added in separate stages and reacted, an overall ratio thereof of 0.8 to 2 times by mol and a ratio of dicyclopentadiene used at each stage of 0.28 to 1 times by mol, with 2,6-disubstituted phenols represented by formula (3), at a temperature of 50 to 200° C.,

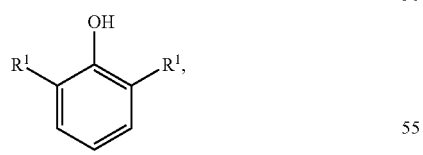

wherein $R^1$ is as defined in General Formula (1),
and wherein the resin has a peak near 3040 cm$^{-1}$ in FT-IR measurement.

2. A method for producing the phenolic resin according to claim 1, the method comprising:
reacting dicyclopentadiene, in a ratio of 0.28 to 1 times by mol, or in a case where dicyclopentadiene is sequentially added in separate stages and reacted, an overall ratio thereof of 0.8 to 2 times by mol and a ratio of dicyclopentadiene used at each stage of 0.28 to 1 times by mol, with 2,6-disubstituted phenols represented by formula (3), at a temperature of 50 to 200° C., in the presence of a Lewis acid at a temperature of 50° C. to 200° C.,

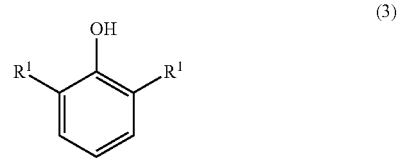

(3)

in the formula, $R^1$'s each independently represent a hydrocarbon group having 1 to 8 carbon atoms.

3. An epoxy resin represented by General Formula (2) below, which is obtained by epoxidizing the phenolic resin according to claim 1:

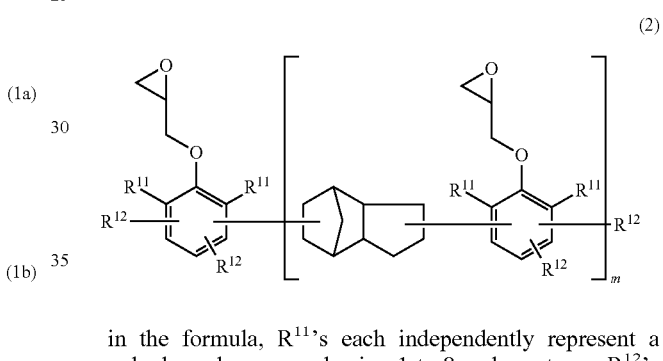

(2)

in the formula, $R^{11}$'s each independently represent a hydrocarbon group having 1 to 8 carbon atoms; $R^{12}$'s each independently represent a hydrogen atom, Formula (1a), or Formula (1b) below, where at least one of $R^{12}$'s is Formula (1a) or Formula (1b); and m represents the number of repetitions, where an average value thereof is a number of 0 to 5,

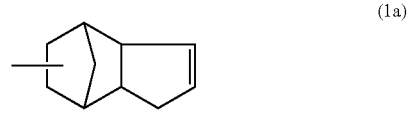

(1a)

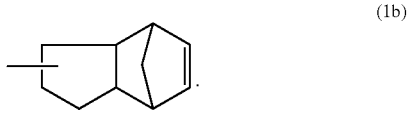

(1b)

4. An epoxy resin composition comprising:
an epoxy resin; and
the phenolic resin according to claim 1.

5. An epoxy resin composition comprising:
the epoxy resin according to claim 3; and
a curing agent.

6. An epoxy resin composition comprising:
the phenolic resin according to claim 1; and
an epoxy resin represented by General Formula (2) below:

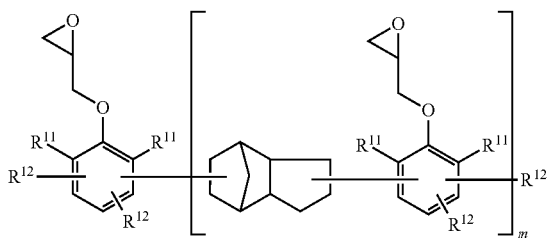

(2)

in the formula, $R^{11}$'s each independently represent a hydrocarbon group having 1 to 8 carbon atoms; $R^{12}$'s each independently represent a hydrogen atom, Formula (1a), or Formula (1b) below, where at least one of $R^{12}$'s is Formula (1a) or Formula (1b); and m represents the number of repetitions, where an average value thereof is a number of 0 to 5,

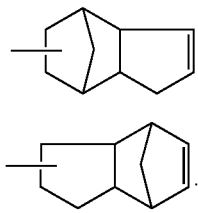

(1a)

(1b)

7. A prepreg comprising the epoxy resin composition according to claim 4.

8. A laminated plate comprising the epoxy resin composition according to claim 4.

9. A printed circuit board comprising the epoxy resin composition according to claim 4.

10. A cured product obtained by curing the epoxy resin composition according to claim 4.

11. A prepreg comprising the epoxy resin composition according to claim 5.

12. A prepreg comprising the epoxy resin composition according to claim 6.

13. A laminated plate comprising the epoxy resin composition according to claim 5.

14. A laminated plate comprising the epoxy resin composition according to claim 6.

15. A printed circuit board comprising the epoxy resin composition according to claim 5.

16. A printed circuit board comprising the epoxy resin composition according to claim 6.

17. A cured product obtained by curing the epoxy resin composition according to claim 5.

18. A cured product obtained by curing the epoxy resin composition according to claim 6.

19. The phenolic resin according to claim 1, wherein the reaction of takes place in the presence of a Lewis acid catalyst of a boron trifluoride-ether complex.

20. The method for producing the phenolic resin according to claim 2, the Lewis acid catalyst is a Lewis acid catalyst of a boron trifluoride-ether complex.

* * * * *